(12) United States Patent
Kim

(10) Patent No.: US 12,126,050 B2
(45) Date of Patent: Oct. 22, 2024

(54) FOLDABLE BATTERY, AND ELECTRONIC DEVICE INCLUDING SAME

(71) Applicant: Samsung Electronics Co., Ltd., Suwon-si (KR)

(72) Inventor: Hyejung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 756 days.

(21) Appl. No.: 17/296,781

(22) PCT Filed: Dec. 12, 2019

(86) PCT No.: PCT/KR2019/017553
§ 371 (c)(1),
(2) Date: May 25, 2021

(87) PCT Pub. No.: WO2020/130483
PCT Pub. Date: Jun. 25, 2020

(65) Prior Publication Data
US 2022/0011817 A1   Jan. 13, 2022

(30) Foreign Application Priority Data

Dec. 17, 2018  (KR) .................. 10-2018-0163469

(51) Int. Cl.
*H01M 50/519*  (2021.01)
*G06F 1/16*  (2006.01)
(Continued)

(52) U.S. Cl.
CPC ........ *H01M 50/519* (2021.01); *G06F 1/1616* (2013.01); *G06F 1/1635* (2013.01);
(Continued)

(58) Field of Classification Search
None
See application file for complete search history.

(56) References Cited

U.S. PATENT DOCUMENTS 9,502,734 B1   11/2016  Lim et al.
9,798,359 B2 *  10/2017  Seo .................. G06F 1/1652
(Continued)

FOREIGN PATENT DOCUMENTS

CN   105830140 A    8/2016
CN   205582986 U *  9/2016
(Continued)

OTHER PUBLICATIONS

Machine translation of JP2002-157997 (no date) (Year: 000).*
(Continued)

*Primary Examiner* — Amanda C. Walke
(74) *Attorney, Agent, or Firm* — Jefferson IP Law, LLP

(57) ABSTRACT

This electronic device comprises: a hinge module; a first housing connected to the hinge module; and a second housing that folds together with the first housing around the hinge module. In a folded state, the electronic device includes: the housings disposed facing each other; and at least one printed circuit board and a battery pack which are disposed in the inner space of the housings. The battery pack includes: a battery cell having a first cell region disposed in the first housing, a second cell region extending from the first cell region and disposed in the second housing through the hinge module, a foldable region connecting the first cell region and the second cell region, a plurality of base material portions stacked so as to extend from the first cell region to the second cell region through the foldable region, and disposed so as to be electrically insulated by separators, and mixture layers applied to one surface or both surfaces of each of the plurality of base material portions; and a PCM unit extending from at least a portion of the battery cell and disposed so as to be electrically connected to the printed circuit board. In the foldable region, the mixture layers may be excluded, and a stacked structure of the plurality of base (Continued)

material portions of different lengths and the separators may be included.

18 Claims, 19 Drawing Sheets

(51) Int. Cl.
    *H01M 4/36*           (2006.01)
    *H01M 10/42*         (2006.01)
    *H01M 50/204*       (2021.01)
    *H01M 50/284*       (2021.01)

(52) U.S. Cl.
    CPC .......... *G06F 1/1652* (2013.01); *G06F 1/1681* (2013.01); *H01M 4/364* (2013.01); *H01M 10/425* (2013.01); *H01M 50/204* (2021.01); *H01M 50/284* (2021.01); *H01M 2220/30* (2013.01)

(56) References Cited

U.S. PATENT DOCUMENTS

| | | | |
|---|---|---|---|
| 10,120,415 B2 * | 11/2018 | Seo | G06F 1/1681 |
| 10,901,464 B2 * | 1/2021 | Seo | G06F 1/1652 |
| 2008/0020279 A1 | 1/2008 | Schmidt et al. | |
| 2012/0121965 A1 | 5/2012 | Makino et al. | |
| 2014/0178729 A1 | 6/2014 | Chung et al. | |
| 2015/0241925 A1 | 8/2015 | Seo et al. | |
| 2016/0013524 A1 * | 1/2016 | Maruoka | H01M 10/488 429/92 |
| 2016/0147263 A1 | 5/2016 | Choi et al. | |
| 2016/0349800 A1 | 12/2016 | Kim et al. | |
| 2017/0025723 A1 * | 1/2017 | Isozaki | H01M 10/486 |
| 2018/0183112 A1 * | 6/2018 | Cheong | H01M 50/284 |
| 2018/0242446 A1 | 8/2018 | Cho et al. | |
| 2018/0294509 A1 * | 10/2018 | Liu | H01M 50/44 |
| 2018/0366813 A1 | 12/2018 | Kim et al. | |
| 2019/0036068 A1 | 1/2019 | Kim et al. | |
| 2019/0326646 A1 * | 10/2019 | Kawai | H01M 50/103 |
| 2020/0303694 A1 | 9/2020 | Koh | |
| 2020/0323086 A1 | 10/2020 | Tadano et al. | |

FOREIGN PATENT DOCUMENTS

| | | | | |
|---|---|---|---|---|
| CN | 108292796 A | | 7/2018 | |
| CN | 108598559 A | * | 9/2018 | ........ H01M 10/0525 |
| CN | 210015921 U | * | 2/2020 | |
| CN | 214505655 U | * | 10/2021 | |
| CN | 113964432 A | * | 1/2022 | |
| CN | 215989034 U | * | 3/2022 | |
| CN | 110600643 B | * | 5/2022 | .......... H01M 10/058 |
| EP | 3 109 847 A1 | | 12/2016 | |
| EP | 3 444 864 A1 | | 2/2019 | |
| JP | 2002-157997 A | | 5/2002 | |
| KR | 10-2012-0053460 A | | 5/2012 | |
| KR | 10-2014-0059737 A | | 5/2014 | |
| KR | 10-2015-0034460 A | | 4/2015 | |
| KR | 10-2015-0099383 A | | 8/2015 | |
| KR | 10-2015-0128063 A | | 11/2015 | |
| KR | 10-2015-0134621 A | | 12/2015 | |
| KR | 10-2016-0061064 A | | 5/2016 | |
| KR | 10-2017-0033516 A | | 3/2017 | |
| KR | 10-2017-0117756 A | | 10/2017 | |
| KR | 10-1834793 B1 | | 3/2018 | |
| KR | 10-1845968 B1 | | 4/2018 | |
| WO | 2017/179865 A1 | | 10/2017 | |
| WO | 2017/209194 A1 | | 12/2017 | |

OTHER PUBLICATIONS

Rejection Decision dated Nov. 30, 2023, issued in Chinese Application No. 201980083215.5.

Chinese Office Action with English translation dated Dec. 27, 2022; Chinese Appln. No. 201980083215.5.

Indian Office Action dated Jan. 4, 2023; Indian Appln. No. 202117024666.

European Search Report dated Oct. 4, 2021; European Appln. No. 19897989.0-1103 / 3843172 PCT/KR2019017553.

Korean Office Action with English translation dated Jun. 30, 2023; Korean Appln. No. 10-2018-0163469.

Chinese Office Action with English translation dated Aug. 5, 2023; Chinese Appln. No. 201980083215.5.

* cited by examiner

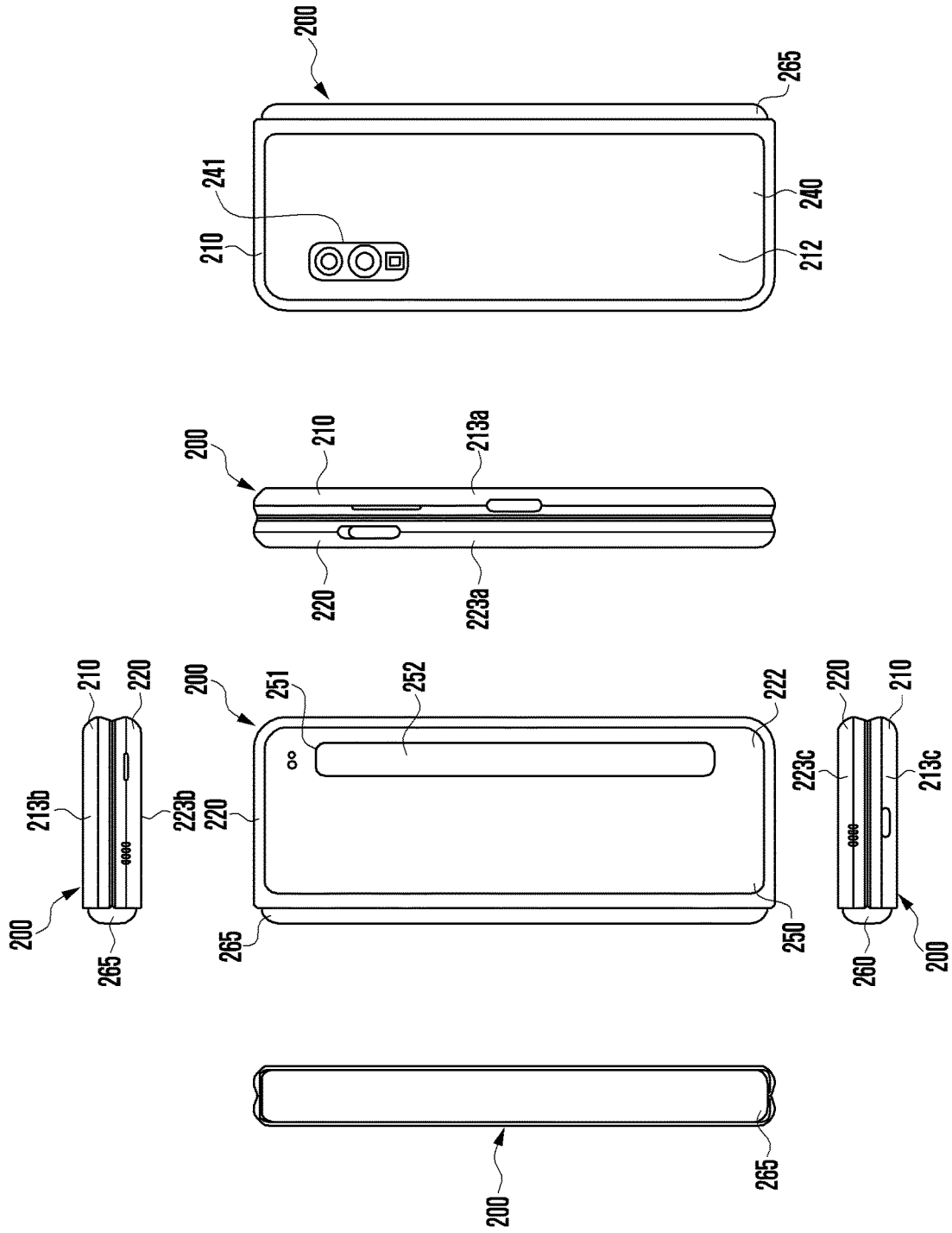

FOLDABLE BATTERY, AND ELECTRONIC DEVICE INCLUDING SAME

TECHNICAL FIELD

Various embodiments of the disclosure relate to a foldable battery and an electronic device including the same.

BACKGROUND ART

Electronic devices are gradually becoming thinner and smaller, and are being improved to increase stiffness, reinforce design aspects, and differentiate functional elements thereof. Electronic devices are gradually transformed from a uniform rectangular shape into various shapes. For example, the electronic device may have a transformable structure that is convenient to carry and that can use a large screen display when used. As the electronic device, a foldable type electronic device is being studied, and a battery applied thereto needs to be developed in a structure capable of responding to a transformable electronic device.

DISCLOSURE OF INVENTION

Technical Problem

A battery (e.g., battery pack) used in an electronic device may include a battery cell that alternately stacks a positive electrode base portion and a negative electrode base portion to which a mixture layer is applied by a separator and sealed by being embedded in a pouch including an electrolyte. The battery cell may be disposed inside the electronic device and be electrically connected to a printed circuit board to provide power to the electronic device.

In recent years, as electronic devices become thinner and smaller, a bendable battery structure that can be applied to a transformable electronic device while securing a degree of freedom for mounting has been proposed. The bendable battery may be configured to allow some degree of bending by connecting a plurality of separated batteries through a conductive cable made of a soft material or by removing a mixture layer in a bendable area.

However, because these batteries have a configuration that removes a mixture layer in a bendable area and depends only on flexibility of a base portion, there is a limit to a bending angle, and such a structure cannot be applied to recently released 180 degree foldable electronic devices. A configuration that electrically connects a plurality of battery cells through a conductive cable also increases resistance because of electrical connection between battery cells compared to the case of using a single battery cell, and a pack pouch is separately used in addition to a pouch including the battery cells; thus, a problem may occur that an energy density is lowered because of an increase in a volume factor that does not contribute to a capacity.

Various embodiments of the disclosure may provide a foldable battery and an electronic device including the same.

According to various embodiments, a battery configured to be folded by 180 degrees while having a single cell structure and an electronic device including the same may be provided.

Solution to Problem

According to various embodiments, an electronic device includes a housing, wherein the housing includes a hinge module; a first housing including a first surface connected to the hinge module and facing in a first direction, a second surface facing in a second direction opposite to the first direction, and a first side member enclosing at least a portion of a first space between the first surface and the second surface; and a second housing including a third surface connected to the hinge module and facing in a third direction, a fourth surface facing in a fourth direction opposite to the third direction, and a second side member enclosing at least a portion of a second space between the third surface and the fourth surface, wherein the second housing is folded with the first housing around the hinge module, wherein the first surface faces the third surface in a folded state, and the third direction is the same as the first direction in an unfolded state; at least one printed circuit board disposed in an internal space of the housing; and a battery pack, wherein the battery pack includes a battery cell, wherein the battery cell includes a first cell area disposed through the first space; a second cell area extended from the first cell area and disposed through the second space; and a foldable area connecting the first cell area and the second cell area; a plurality of base portions stacked to extend from the first cell area to the second cell area through the foldable area and disposed to be electrically insulated through separators; and mixture layers applied to one surface or both surfaces of each of the plurality of base portions; and a PCM unit extended from at least a portion of the battery cell and disposed to be electrically connected to the printed circuit board, wherein in the foldable area, the mixture layers are omitted, and the foldable area includes a stacked structure of the plurality of base portions and the separators having different lengths.

According to various embodiments, a battery pack disposed inside an electronic device, the battery pack includes a battery cell, wherein the battery cell includes a first cell area disposed through a first space; a second cell area extended from the first cell area and disposed through a second space; and a foldable area connecting the first cell area and the second cell area; a plurality of base portions stacked to extend from the first cell area to the second cell area through the foldable area and disposed to be electrically insulated through separators; and mixture layers applied to one surface or both surfaces of each of the plurality of base portions; and a PCM unit extended from at least a portion of the battery cell and disposed to be electrically connected to a printed circuit board of the electronic device, wherein in the foldable area, the mixture layers are omitted, and the foldable area includes a stacked structure of the plurality of base portions and the separators having different lengths.

Advantageous Effects of Invention

A battery according to various embodiments of the disclosure has a structure capable of relieving a stress on a foldable area, thereby ensuring a degree of freedom of folding, and having a single cell structure; thus, space utilization when mounting the battery in an electronic device can be improved.

BRIEF DESCRIPTION OF DRAWINGS

In connection with the description of the drawings, the same or similar reference numerals may be used for the same or similar components.

FIG. 2B is a diagram illustrating a folded state of the electronic device of FIG. 2A according to various embodiments of the disclosure.

MODE FOR THE INVENTION

Figure 1:
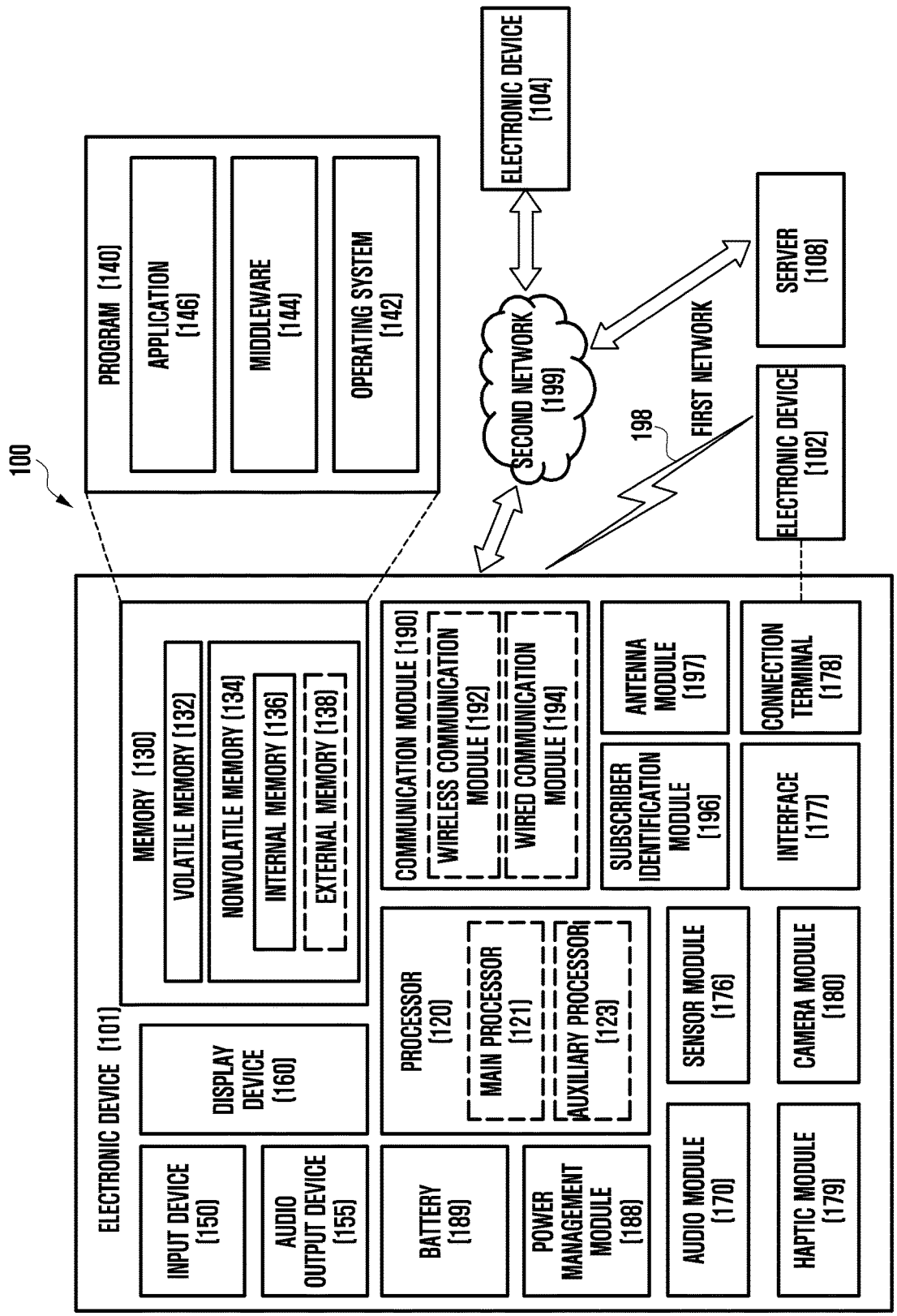
FIG. 1 is a block diagram of an electronic device in a network environment according to various embodiments.

FIG. 1 is a block diagram of an electronic device in a network environment according to an embodiment of the disclosure.

Referring to FIG. 1, in a network environment 100, an electronic device 101 may communicate with a first external electronic device 102 through a first network 198 (e.g., short-range wireless communication network) or may communicate with a second external electronic device 104 or a server 108 through a second network 199 (e.g., long-distance wireless communication network). In one embodiment, the electronic device 101 may communicate with the second external electronic device 104 through the server 108. According to an embodiment, the electronic device 101 may include a processor 120, a memory 130, an input unit 150, a sound output unit 155, a display unit 160, an audio module 170, a sensor module 176, an interface 177, a haptic module 179, a camera module 180, a power management module 188, a battery 189, a communication module 190, a subscriber identification module 196, and an antenna module 197. In one embodiment, at least one component (e.g., the display unit 160 or the camera module 180) among the components of the electronic device 101 may be omitted, or other components may be added to the electronic device 101. In one embodiment, some of these components may be implemented as an integrated circuit. For example, the sensor module 176 (e.g., fingerprint sensor, iris sensor, or illuminance sensor) may be embedded in the display unit 160 (e.g., display).

The processor 120 may execute, for example, software (e.g., a program 140) to control at least one of other components (e.g., hardware component or software component) of the electronic device 101 connected to the processor 120, and may process a variety of data or perform various computations. In one embodiment, as part of data processing or computation, the processor 120 may load a command or data received from other components (e.g., the sensor module 176 or the communication module 190) into the volatile memory 132, process the command or data stored in the volatile memory 132, and store the result data in nonvolatile memory 134. In one embodiment, the processor 120 may include a main processor 121 (e.g., central processing unit, or application processor), and a secondary processor 123 (e.g., graphics processing unit, image signal processor, sensor hub processor, or communication processor), which may operate independently of or in cooperation with the main processor 121. Additionally or alternatively, the secondary processor 123 may consume less power or may be more specialized in a specific function compared with the main processor 121. The secondary processor 123 may be implemented separately from or as part of the main processor 121.

The secondary processor 123 may control at least some of the functions or states associated with at least one component (e.g., the display unit 160, the sensor module 176, or the communication module 190) among the components of the electronic device 101, for example, instead of the main processor 121 while the main processor 121 is in an inactive (e.g., sleep) state, or together with the main processor 121 while the main processor 121 is in an active (e.g., application execution) state. In one embodiment, the secondary processor 123 (e.g., image signal processor or communication processor) may be implemented as a part of another component (e.g., the camera module 180 or the communication module 190) that is functionally related to the secondary processor 123.

The memory 130 may store a variety of data used by at least one component (e.g., the processor 120 or the sensor module 176) of the electronic device 101. The data may include, for example, software (e.g., the program 140) and input data or output data for commands associated with the software. The memory 130 may include the volatile memory 132 or the nonvolatile memory 134.

The programs 140 may be stored in the memory 130 as software, and may include, for example, an operating system 142, a middleware 144, or an application 146.

The input unit 150 may receive a command or data, which can be to be used for a component (e.g., the processor 120) of the electronic device 101, from the outside of the electronic device 101 (e.g., user). The input unit 150 may include, for example, a microphone, a mouse, a keyboard, or a digital pen (e.g., stylus pen).

The sound output unit 155 may output a sound signal to the outside of the electronic device 101. The sound output unit 155 may include, for example, a speaker and a receiver. The speaker may be used for general purposes, such as playback of multimedia or recordings, and the receiver may be used for receiving an incoming call. In one embodiment, the receiver may be implemented separately from or as part of the speaker.

The display unit 160 may visually present information to the outside of the electronic device 101 (e.g., user). The display unit 160 may include, for example, a display, a hologram device, or a projector, and a control circuit for controlling these. In one embodiment, the display unit 160 may include a touch circuitry configured to sense a touch, or a sensing circuitry (e.g., pressure sensor) configured to measure the strength of a force caused by a touch action.

The audio module 170 may convert a sound into an electric signal or convert an electric signal into a sound. In one embodiment, the audio module 170 may obtain a sound signal through the input unit 150 or may output a sound signal through an external electronic device (e.g., the first external electronic device 102 (e.g., speaker or headphone)) wiredly or wirelessly connected to the sound output unit 155 or the electronic device 101.

The sensor module 176 may generate an electrical signal or a data value corresponding to the operating state (e.g., power or temperature) of the electronic device 101 or the environmental state (e.g., user state) outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols that enable the electronic device 101 to directly or wirelessly connect to an external electronic device (e.g., the first external electronic device 102). In one embodiment, the interface 177 may include, for example, a high-definition multimedia interface (HDMI), a universal serial bus (USB) interface, an SD card interface, or an audio interface.

The connection terminal 178 may include a connector through which the electronic device 101 can be physically connected to an external electronic device (e.g., the first external electronic device 102). In one embodiment, the connection terminal 178 may include, for example, an HDMI connector, a USB connector, a secure digital (SD) card connector, or an audio connector (e.g., headphone connector).

The haptic module 179 may convert an electrical signal into a mechanical stimulus (e.g., vibration or motion) or an electrical stimulus that can be perceived by the user through tactile or kinesthetic senses. In one embodiment, the haptic module 179 may include, for example, a motor, a piezoelectric element, or an electric stimulator.

The camera module 180 may capture a still image or a moving image. In one embodiment, the camera module 180 may include at least one lens, an image sensor, an image signal processor, or a flash.

The power management module 188 may manage the power supplied to the electronic device 101. The power management module 188 may be implemented as part of a power management integrated circuit (PMIC).

The battery 189 may supply power to at least one component of the electronic device 101. In one embodiment, the battery 189 may include, for example, a non-rechargeable primary cell, a rechargeable secondary cell, or a fuel cell.

The communication module 190 may establish a wired or wireless communication channel between the electronic device 101 and the external electronic device (e.g., the first external electronic device 102, the second external electronic device 104, or the server 108) and support communication through the established communication channel. The communication module 190 may include at least one communication processor that can operate separately from the processor 120 (e.g., application processor) to support wired or wireless communication. In one embodiment, the communication module 190 may include a wireless communication module 192 (e.g., cellular communication module, short-range wireless communication module, or global navigation satellite system (GNSS) communication module), or a wired communication module 194 (e.g., local area network (LAN) communication module, or power line communication module). The corresponding communication module may communicate with an external electronic device through the first network 198 (e.g., short-range communication network such as Bluetooth, Wi-Fi direct, or infrared data association (IrDA)) or through the second network 199 (e.g., long-distance communication network such as a cellular network, the Internet, or a computer network like a LAN or WAN). The above various communication modules may be implemented as one component (e.g., single chip) or as separate components (e.g., multiple chips). The wireless communication module 192 may identify and authenticate the electronic device 101 in the communication network such as the first network 198 or the second network 199 by using subscriber information stored in the subscriber identification module 196.

The antenna module 197 may transmit or receive a signal or power to or from the outside (e.g., the external electronic devices 102 or 104). In one embodiment, the antenna module 197 may include one antenna having a radiator made of a conductor or conductive pattern formed on a substrate (e.g., PCB). In one embodiment, the antenna module 197 may include a plurality of antennas. In this case, at least one antenna suitable for the communication scheme used in the communication network such as the first network 198 or the second network 199 may be selected from the plurality of antennas by, for example, the communication module 190. The signal or power may be transmitted or received between the communication module 190 and the external electronic devices 102 or 104 through the selected at least one antenna. In one embodiment, in addition to the radiator, another component (e.g., radio frequency integrated circuit (RFIC)) may be further formed as part of the antenna module 197.

At least some of the above components may be connected to each other via a communication scheme between peripherals (e.g., bus, general purpose input and output (GPIO), serial peripheral interface (SPI), or mobile industry processor interface (MIPI)), and may exchange signals (e.g., commands or data) with each other.

In one embodiment, commands or data may be exchanged between the electronic device 101 and the second external electronic device 104 through the server 108 connected to the second network 199. The external electronic devices 102 and 104 may be of the same type as or a different type from the electronic device 101. In one embodiment, all or some of the operations that can be performed by the electronic device 101 may be performed by one or more of the external electronic devices 102, 104 and 108. For example, to perform a certain function or service automatically or upon request, the electronic device 101 may, instead of or in addition to executing the function or service, request one or more external electronic devices to execute at least some of the function or service. Upon reception of the request, the external electronic devices may execute at least a portion of the requested function or service or an additional function or service related to the request, and return the execution results to the electronic device 101. The electronic device 101 may further process the received results if necessary and provide the processing results as a response to the requested function or service. To this end, technologies such as cloud computing, distributed computing, and client-server computing may be used.

The electronic device according to various embodiments disclosed herein can be one of various types of devices, such as portable communication devices (e.g., smartphones), computers, portable multimedia devices, portable medical instruments, cameras, wearable devices, and home appliances. However, the electronic device is not limited to the above-mentioned devices.

It should be understood that the various embodiments of the disclosure and the terminology used herein are not intended to limit the techniques described herein to specific embodiments but to include various modifications, equivalents, and/or alternatives thereof. In the drawings, the same or similar reference symbols are used to refer to the same or like parts. In the description, the singular forms "a", "an" and "the" are intended to include the plural forms as well, unless the context clearly indicates otherwise. In the description, the expression "A or B", "at least one of A and/or B", "A, B or C", or "at least one of A, B and/or C" may indicate all possible combinations of the listed items. The terms "first" and "second" may refer to various elements regardless of importance and/or order and are used to distinguish one element from another element without limitation. It will be understood that when an element (e.g., first element) is referred to as being (functionally or communicatively) "coupled with/to" or "connected with/to" another element (e.g., second element), it can be coupled or connected with/to the other element directly (wiredly), wirelessly, or via a third element.

In the description, the term "module" may refer to a certain unit that is implemented in hardware, software, firmware, or a combination thereof. The term "module" may be used interchangeably with the term "unit", "logic", "logical block", "component", or "circuit", for example. The module may be the minimum unit, or a part thereof, which performs one or more particular functions. For example, a module may be implemented in the form of an application-specific integrated circuit (ASIC).

Various embodiments of the disclosure may be implemented in software (e.g., the programs 140) including instructions stored in a machine-readable storage medium (e.g., internal memory 136 or external memory 138) readable by a machine (e.g., the electronic device 101). For example, the processor (e.g., the processor 120) of the machine (e.g., the electronic device 101) can fetch a stored instruction from a storage medium and execute the fetched instruction. When the instruction is executed by the processor, the machine may perform the function corresponding to the instruction. The instructions may include a code generated by a compiler and a code executable by an interpreter. The machine-readable storage medium may be provided in the form of a non-transitory storage medium. Here, "non-transitory" means that the storage medium does not include a signal and is tangible, but does not distinguish whether data is stored semi-permanently or temporarily in the storage medium.

The method according to various embodiments disclosed herein may be provided as a computer program product. A computer program product may be traded between a seller and a purchaser as a commodity. A computer program product may be distributed in the form of a machine-readable storage medium (e.g., compact disc read only memory (CD-ROM)) or be distributed online (e.g., download or upload) directly between two user devices (e.g. smartphones) through an application store (e.g., PlayStore™). For on-line distribution, at least a portion of the computer program product may be temporarily stored or temporarily created in a storage medium such as a memory of a manufacturer's server, an application store's server, or a relay server.

Each of the components (e.g., modules or programs) according to various embodiments described above may be composed of one or more elements. An existing component may be omitted, and a new component may be added. Alternatively or additionally, some of the components (e.g., modules or programs) may be combined into one entity while maintaining the same functionality. Operations supported by a module, program, or another component may be carried out in sequence, in parallel, by repetition, or heuristically. Some operations may be executed in a different order or may be omitted, and a new operation may be added.

Figure 2A:
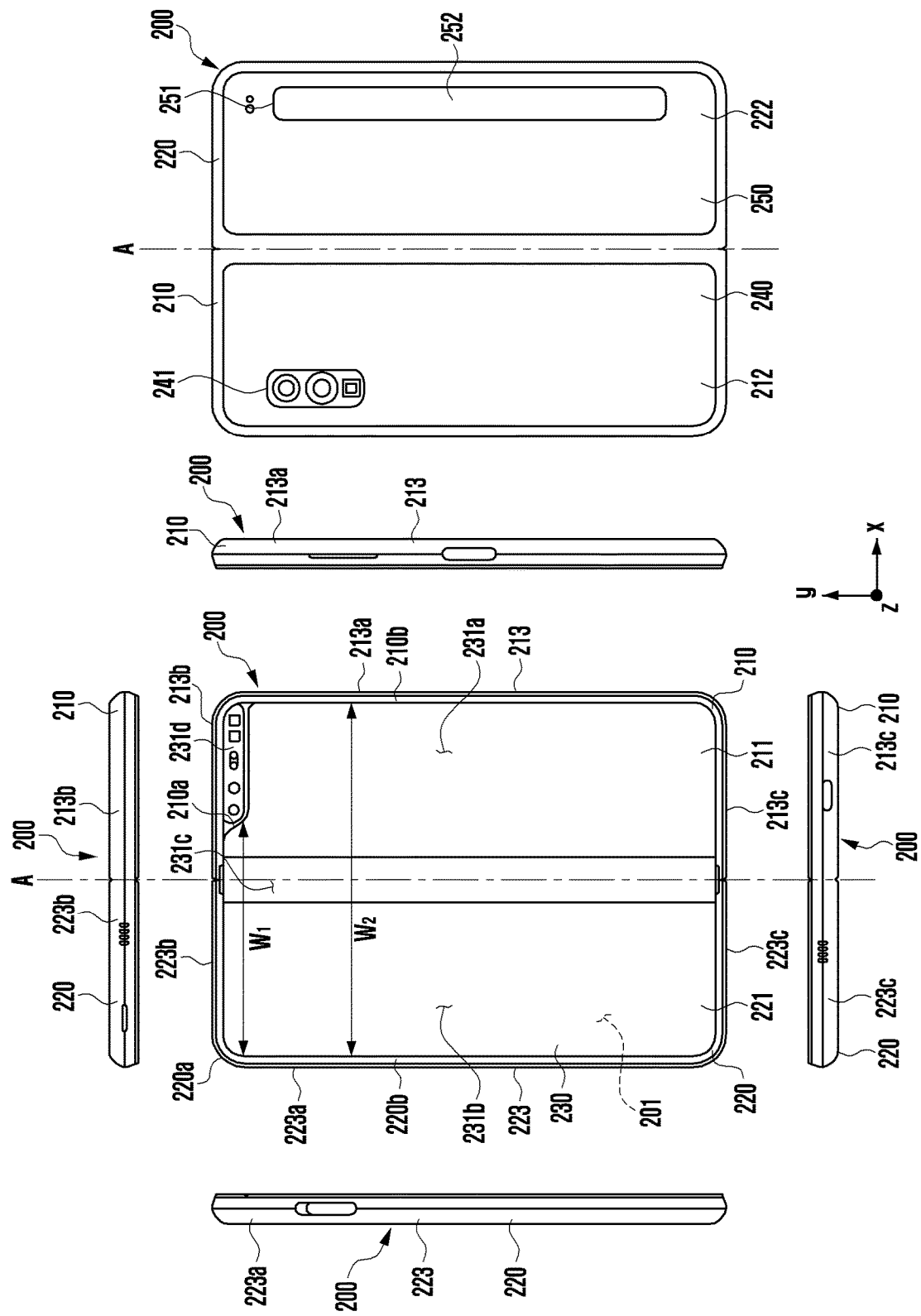
FIG. 2A is a diagram illustrating an unfolded state of an electronic device according to various embodiments of the disclosure.

FIG. 2A is a view illustrating an electronic device in a flat state according to an embodiment of the disclosure.

FIG. 2B is a view illustrating an electronic device in a folded state according to an embodiment of the disclosure.

Embodiments for an electronic device of FIGS. 2A and 2B may be at least partially similar to or different from those for the electronic device 101 of FIG. 1. Referring to FIG. 2A, an electronic device 200 may include a pair of housing structures 210 and 220 rotatably coupled via a hinge structure (e.g., hinge structure 264 in FIG. 3) to be folded relative to each other, a hinge cover 265 covering the foldable portion of the pair of housing structures 210 and 220, and a display 230 (e.g., flexible display or foldable display) disposed in the space formed by the pair of housing structures 210 and 220. In the description, the surface on which the display 230 is disposed may be referred to as the front surface of the electronic device 200, and the opposite side of the front surface may be referred to as the rear surface of the electronic device 200. The surface surrounding the space between the front surface and the rear surface may be referred to as the side surface of the electronic device 200.

In one embodiment, the pair of housing structures 210 and 220 may include a first housing structure 210 including a sensor region 231d, a second housing structure 220, a first rear cover 240, and a second rear cover 250. The pair of housing structures 210 and 220 of the electronic device 200 are not limited to the shape or combination illustrated in FIGS. 2A and 2B, but may be implemented in various shapes or combinations. For example, in another embodiment, the first housing structure 210 and the first rear cover 240 may be formed as a single body, and the second housing structure 220 and the second rear cover 250 may be formed as a single body.

In one embodiment, the first housing structure 210 and the second housing structure 220 may be disposed at both sides with respect to the folding axis (A) and may be substantially symmetrical with respect to the folding axis (A). In one embodiment, the angle or distance between the first housing structure 210 and the second housing structure 220 may vary depending upon whether the electronic device 200 is in the flat state or closed state, the folded state, or the intermediate state. In one embodiment, the first housing structure 210 includes the sensor region 231d where various sensors are disposed, but may have a symmetrical shape with the second housing structure 220 in other regions. In another embodiment, the sensor region 231d may be disposed in a specific region of the second housing structure 220 or may be replaced.

In one embodiment, during the flat state of the electronic device 200, the first housing structure 210 may be connected to the hinge structure (e.g., hinge structure 264 in FIG. 3), and may include a first surface 211 facing the front surface of the electronic device 200, a second surface 212 facing away from the first surface 211, and a first side member 213 enclosing at least a portion of the space between the first surface 211 and the second surface 212. In one embodiment, the first side member 213 may include a first side surface 213a disposed in parallel with the folding axis (A), a second side surface 213b extending from one end of the first side surface 213a in a direction perpendicular to the folding axis, and a third side surface 213c extending from the other end of the first side surface 213a in a direction perpendicular to the folding axis.

In one embodiment, during the flat state of the electronic device 200, the second housing structure 220 may be connected to the hinge structure (e.g., hinge structure 264 in FIG. 3), and may include a third surface 221 facing the front surface of the electronic device 200, a fourth surface 222 facing away from the third surface 221, and a second side member 223 enclosing at least a portion of the space between the third surface 221 and the fourth surface 222. In one embodiment, the second side member 223 may include a fourth side surface 223a disposed in parallel with the folding axis (A), a fifth side surface 223b extending from one end of the fourth side surface 223a in a direction perpendicular to the folding axis, and a sixth side surface 223c extending from the other end of the fourth side surface 223a in a direction perpendicular to the folding axis. In one embodiment, the third surface 221 may face the first surface 211 in the folded state.

In one embodiment, the electronic device 200 may include a recess 201 formed to accommodate the display 230 through a structural combination of the shapes of the first housing structure 210 and the second housing structure 220. The recess 201 may have substantially the same size as the display 230. In one embodiment, the recess 201 may have two or more different widths in a direction perpendicular to the folding axis (A) due to the sensor region 231d. For example, the recess 201 may have a first width (W1) between a first portion 220a of the second housing structure 220 parallel to the folding axis (A) and a first portion 210a of the first housing structure 210 formed at the edge of the sensor region 231d, and have a second width (W2) between a second portion 220b of the second housing structure 220 and a second portion 210b of the first housing structure 210 that does not correspond to the sensor region 213d and is parallel to the folding axis (A). Here, the second width (W2) may be wider than the first width (W1). In other words, the recess 201 may be formed to have the first width (W1) ranging from the first portion 210a of the first housing structure 210 to the first portion 220a of the second housing structure 220 (asymmetric shape), and the second width (W2) ranging from the second portion 210b of the first housing structure 210 to the second portion 220b of the second housing structure 220 (symmetric shape). In one embodiment, the first portion 210a and the second portion 210b of the first housing structure 210 may be located at different distances from the folding axis (A). The width of the recess 201 is not limited to the example shown above. In various embodiments, the recess 201 may have two or more different widths owing to the shape of the sensor region 213d or the asymmetry of the first housing structure 210 or the second housing structure 220.

In one embodiment, at least a portion of the first housing structure 210 and the second housing structure 220 may be made of a metal or non-metal material having a rigidity value selected to support the display 230.

In one embodiment, the sensor region 231d may be formed to have a preset area near to one corner of the first housing structure 210. However, the arrangement, shape, or size of the sensor region 231d is not limited to the illustrated example. For example, in a certain embodiment, the sensor region 231d may be formed at another corner of the first housing structure 210 or in any region between the upper corner and the lower corner. In another embodiment, the sensor region 231d may be disposed at a portion of the second housing structure 220. In another embodiment, the sensor region 231d may be formed to extend between the first housing structure 210 and the second housing structure 220. In one embodiment, to perform various functions, the electronic device 200 may include components exposed to the front surface of the electronic device 200 through the sensor region 213d or through one or more openings provided in the sensor region 231d. The components may include, for example, at least one of a front camera, a receiver, a proximity sensor, an illuminance sensor, an iris recognition sensor, an ultrasonic sensor, or an indicator.

In one embodiment, the first rear cover 240 may be disposed on the second surface 212 of the first housing structure 210 and may have a substantially rectangular periphery. In one embodiment, at least a portion of the periphery may be wrapped by the first housing structure 210. Similarly, the second rear cover 250 may be disposed on the fourth surface 222 of the second housing structure 220, and at least a portion of the periphery thereof may be wrapped by the second housing structure 220.

In the illustrated embodiment, the first rear cover 240 and the second rear cover 250 may have a substantially symmetrical shape with respect to the folding axis (A). In another embodiment, the first rear cover 240 and the second rear cover 250 may have various different shapes. In another embodiment, the first rear cover 240 may be formed as a single body with the first housing structure 210, and the second rear cover 250 may be formed as a single body with the second housing structure 220.

In one embodiment, the first rear cover 240, the second rear cover 250, the first housing structure 210, and the second housing structure 220 may be combined with each other so as to provide a space where various components (e.g., printed circuit board, antenna module, sensor module, and battery) of the electronic device 200 can be arranged. In one embodiment, one or more components may be disposed on or visually exposed via the rear surface of the electronic device 200. For example, one or more components or sensors may be visually exposed through the first rear region 241 of the first rear cover 240. The sensors may include a proximity sensor, a rear camera, and/or a flash. In another embodiment, at least a portion of the sub-display 252 may be visually exposed through the second rear region 251 of the second rear cover 250.

The electronic device 200 may be disposed on the space formed by the pair of housing structures 210 and 220. For example, the electronic device 200 may be seated in the recess (e.g., recess 201 in FIG. 2A) formed by the pair of housing structures 210 and 220, and may be disposed to substantially occupy most of the front surface of the electronic device 200. Hence, the front surface of the electronic device 200 may include the display 230, a portion (e.g., edge region) of the first housing structure 210 close to the display 230, and a portion (e.g. edge region) of the second housing structure 220 close to the display 230. In one embodiment, the rear surface of the electronic device 200 may include the first rear cover 240, a portion (e.g., edge region) of the first housing structure 210 close to the first rear cover 240, the second rear cover 250, and a portion (e.g. edge region) of the second housing structure 220 close to the second rear cover 250.

In one embodiment, the display 230 may refer to a display whose at least a portion may be deformed into a flat or curved surface. In one embodiment, the display 230 may include a folding region 231c, a first region 231a disposed on one side (e.g., right side of the folding region 231c) with respect to the folding region 231c, and a second region 231b disposed on the other side (e.g., left side of the folding region 231c). For example, the first region 231a may be disposed on the first surface 211 of the first housing structure 210, and the second region 231b may be disposed on the third surface 221 of the second housing structure 220. This demarcation of the display 230 is only an example, and the display 230 may be subdivided into plural regions (e.g., four or more regions) according to the structure or functionality. For example, in the embodiment of FIG. 2A, the area of the display 230 may be subdivided with respect to the folding region 231c or the folding axis (A) extending parallel to the y-axis. However, in another embodiment, the area of the display 230 may be subdivided with respect to a different folding region (e.g., folding region parallel to the x-axis) or a different folding axis (e.g., folding axis parallel to the x-axis). The aforementioned subdivision of the display is only a physical demarcation based on the pair of housing structures 210 and 220 and the hinge structure (e.g., hinge structure 264 in FIG. 3), and the display 230 may substantially present one full screen through the pair of housing structures 210 and 220 and the hinge structure (e.g., hinge structure 264 in FIG. 3). In one embodiment, the first region 231a and the second region 231b may have a symmetrical shape with respect to the folding region 231c. Although the first region 231a may include a notch region (e.g., notch region 233 in FIG. 3) cut according to the presence of the sensor region 231d, it may have a symmetrical shape with the second region 231b in other portions. In other words, the first region 231a and the second region 231b may include portions with symmetrical shapes and portions with asymmetrical shapes.

Figure 3:
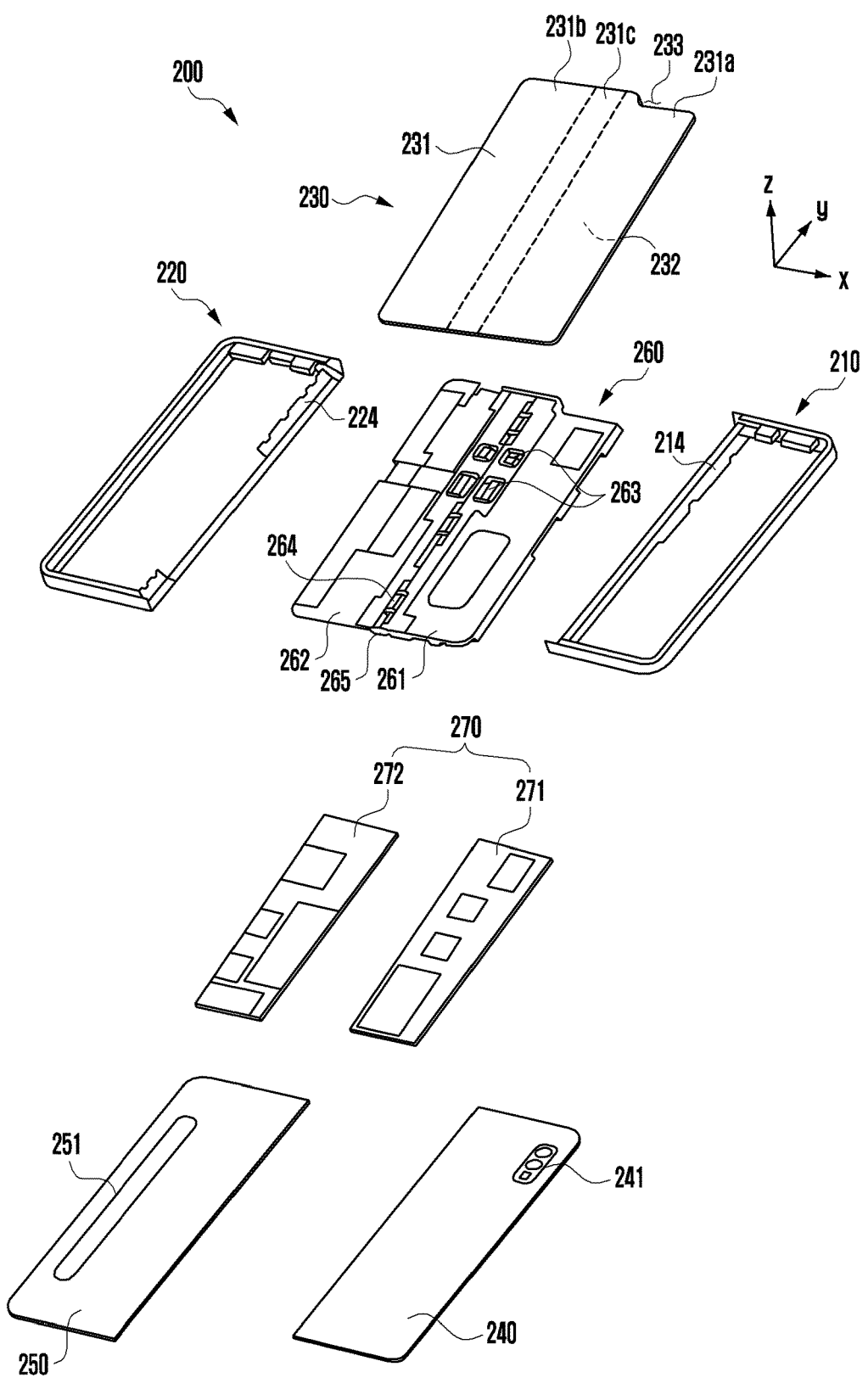
FIG. 3 is an exploded perspective view of an electronic device according to various embodiments of the disclosure.

Referring to FIG. 2B, the hinge cover 265 may be disposed between the first housing structure 210 and the second housing structure 220 so as to cover the internal components (e.g., hinge structure 264 in FIG. 3). In one embodiment, the hinge cover 265 may be covered by portions of the first housing structure 210 and the second housing structure 220 or be exposed to the outside according to the operating state (e.g., flat state or folded state) of the electronic device 200.

For example, when the electronic device 200 is in the flat state as illustrated in FIG. 2A, the hinge cover 265 may be covered by the first housing structure 210 and the second housing structure 220 so as not to be exposed. When the electronic device 200 is in the folded state (e.g., completely folded state) as illustrated in FIG. 2B, the hinge cover 265 may be exposed to the outside between the first housing structure 210 and the second housing structure 220. When the electronic device 200 is in the intermediate state where the first housing structure 210 and the second housing structure 220 make a certain angle, the hinge cover 265 may be partially exposed to the outside between the first housing structure 210 and the second housing structure 220. In this case, the exposed portion may be less than that for the fully folded state. In one embodiment, the hinge cover 265 may include a curved surface.

Next, a description is given of configurations of the first housing structure 210 and the second housing structure 220 and regions of the display 230 according to the operating state (e.g. flat state or folded state) of the electronic device 200.

In one embodiment, when the electronic device 200 is in the flat state (e.g., state of FIG. 2A), the first housing structure 210 and the second housing structure 220 may make an angle of 180 degrees, and the first region 231a and the second region 231b of the display may be disposed to face in the same direction. In addition, the folding region 231c may be coplanar with the first region 231a and the second region 231b.

In one embodiment, when the electronic device 200 is in the folded state (e.g., state of FIG. 2B), the first housing structure 210 and the second housing structure 220 may be disposed to face each other. The first region 231a and the second region 231b of the display 230 may face each other, making a narrow angle (e.g., between 0 degrees and 10 degrees). At least a portion of the folding region 231c may form a curved surface with a preset curvature.

In one embodiment, when the electronic device 200 is in the intermediate state, the first housing structure 210 and the second housing structure 220 may be disposed to make a certain angle. The first region 231a and the second region 231b of the display 230 may form an angle greater than that for the folded state and less than that for the flat state. At least a portion of the folding region 231c may form a curved surface with a preset curvature. This curvature may be less than that for the folded state.

FIG. 3 is an exploded perspective view of an electronic device according to an embodiment of the disclosure.

Referring to FIG. 3, in one embodiment, the electronic device 200 may include a display 230, a support member assembly 260, at least one printed circuit board 270, a first housing structure 210, a second housing structure 220, a first rear cover 240, and a second rear cover 250. In the description, the display 230 may be referred to as a display unit, display module, or display assembly.

The display 230 may include a display panel 231 (e.g., flexible display panel), and at least one plate 232 or layer on which the display panel 231 is seated. In one embodiment, the plate 232 may be disposed between the display panel 231 and the support member assembly 260. The display panel 231 may be disposed on at least a portion of one surface (e.g., surface in the Z direction in FIG. 3) of the plate 232. The plate 232 may be formed in a shape corresponding to the display panel 231. For example, a portion of the plate 232 may be formed in a shape corresponding to the notch region 233 of the display panel 231.

The support member assembly 260 may include a first support member 261, a second support member 262, a hinge structure 264 disposed between the first support member 261 and the second support member 262, a hinge cover 265 to cover the hinge structure 264 when viewed from the outside, and a wiring member 263 (e.g., flexible printed circuit board (FPCB)) that crosses the first support member 261 and the second support member 262.

In one embodiment, the support member assembly 260 may be disposed between the plate 232 and at least one printed circuit board 270. For example, the first support member 261 may be disposed between the first region 231a of the display 230 and the first printed circuit board 271. The second support member 262 may be disposed between the second region 231b of the display 230 and the second printed circuit board 272.

In one embodiment, at least a portion of the wiring member 263 and the hinge structure 264 may be disposed within the support member assembly 260. The wiring member 263 may be disposed in a direction crossing the first support member 261 and the second support member 262 (e.g., x-axis direction). The wiring member 263 may be disposed in a direction (e.g., x-axis direction) perpendicular to the folding axis (e.g., y-axis or folding axis (A) in FIG. 2A) of the folding region 231c.

The at least one printed circuit board 270 may include, as described above, the first printed circuit board 271 disposed on the side of the first support member 261, and the second printed circuit board 272 disposed on the side of the second support member 262. The first printed circuit board 271 and the second printed circuit board 272 may be disposed inside the space formed by the support member assembly 260, the first housing structure 210, the second housing structure 220, the first rear cover 240, and the second rear cover 250. Various components for implementing functions of the electronic device 200 may be mounted on the first printed circuit board 271 and the second printed circuit board 272.

In one embodiment, in a state where the display 230 is coupled to the support member assembly 260, the first housing structure 210 and the second housing structure 220 may be assembled to each other so as to be coupled to both sides of the support member assembly 260. As described below, the first housing structure 210 and the second housing structure 220 may be coupled to the support member assembly 260 by being slid on both sides of the support member assembly 260.

In one embodiment, the first housing structure 210 may include a first rotary support surface 214, and the second housing structure 220 may include a second rotary support surface 224 corresponding to the first rotary support surface 214. The first rotary support surface 214 and the second rotary support surface 224 may include a curved surface corresponding to the curved surface included in the hinge cover 265.

In one embodiment, when the electronic device 200 is in the flat state (e.g., state of FIG. 2A), the first rotary support surface 214 and the second rotary support surface 224 may cover the hinge cover 265 so that the hinge cover 265 may be not or minimally exposed to the rear surface of the electronic device 200. When the electronic device 200 is in the folded state (e.g., state of FIG. 2B), the first rotary support surface 214 and the second rotary support surface 224 may rotate along the curved surface included in the hinge cover 265 so that the hinge cover 265 may be maximally exposed to the rear surface of the electronic device 200.

Figure 4A:
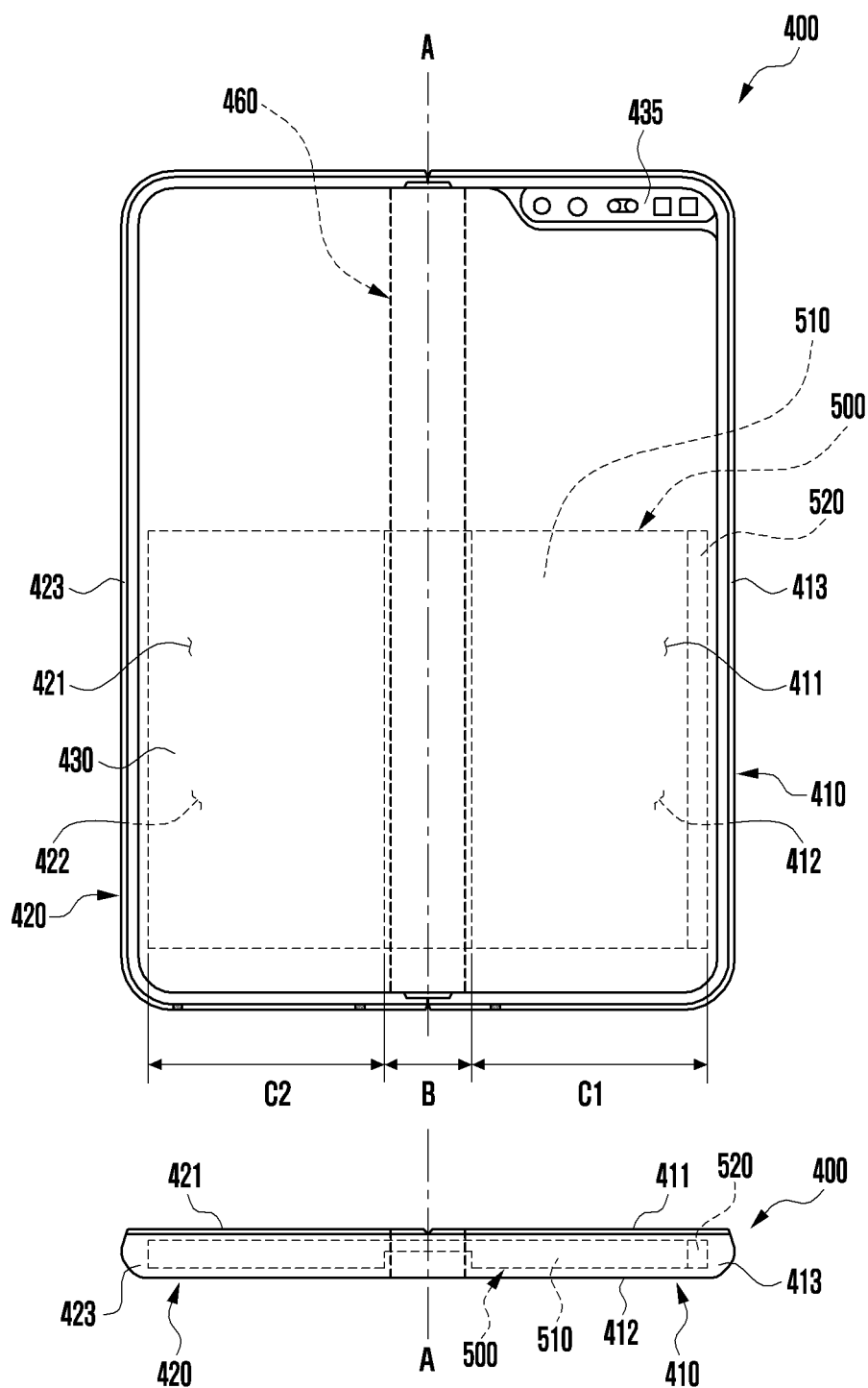
FIGS. 4A and 4B are diagrams illustrating a configuration of a battery pack operating together according to unfolding and folding operations of an electronic device according to various embodiments of the disclosure.
Figure 4B:
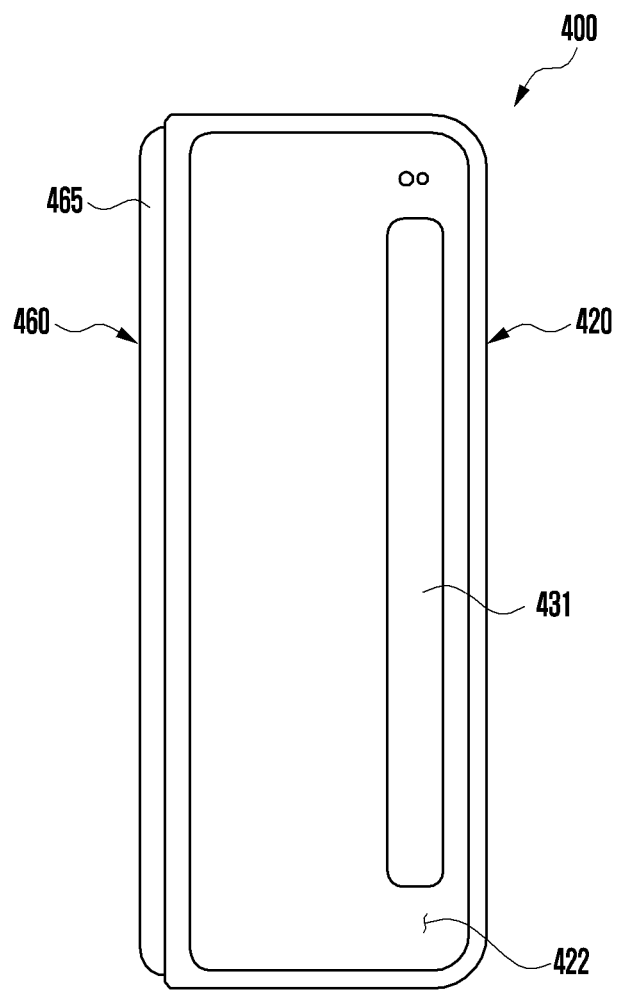
Figure 4B:
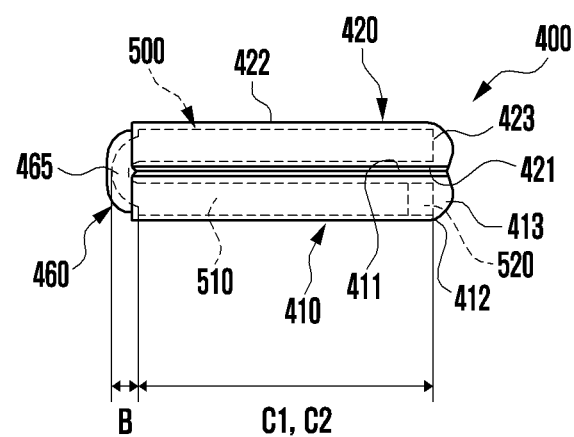

FIGS. 4A and 4B are diagrams illustrating a configuration of a battery pack 500 operating together according to unfolding and folding operations of an electronic device 400 according to various embodiments of the disclosure.

The electronic device 400 of FIGS. 4A and 4B may be at least partially similar to the electronic device 101 of FIG. 1 or the electronic device 200 of FIGS. 2A to 3 or may further include other components of the electronic device.

Referring to FIGS. 4A and 4B, the electronic device 400 may include foldable housing structures 410 and 420 disposed to be rotatable based on a folding axis A. According to an embodiment, the foldable housing structures 410 and 420 may include a first housing 410 (e.g., the first housing structure 210 of FIG. 2A) and a second housing 420 (e.g., the second housing structure 220 of FIG. 2A). According to an embodiment, the first housing 410 and the second housing 420 may be rotatably connected by a hinge module 460 (e.g., the hinge structure 264 of FIG. 3). For example, the first housing 410 and the second housing 420 may be folded to face each other based on the folding axis A by the hinge module 460 or may be opened to each other to have the same plane.

According to various embodiments, the first housing 410 may include a first surface 411 facing in a first direction (e.g., the Z-axis direction of FIG. 3), a second surface 412 facing in a second direction (e.g., –Z axis direction of FIG. 3) opposite to the first direction, and a first side member 413 enclosing at least a portion of a first space between the first surface 411 and the second surface 412. According to an embodiment, at least a portion of the first side member 413 may be formed with a conductive member (e.g., metal member).

According to various embodiments, the second housing 420 may include a third surface 421 facing in a third direction (e.g., the Z-axis direction of FIG. 3), a fourth surface 422 facing in a fourth direction (e.g., –Z axis direction of FIG. 3) opposite to the third direction, and a second side member 423 enclosing at least a portion of a second space between the third surface 421 and the fourth surface 422. According to an embodiment, at least a portion of the second side member 423 may also be formed with a conductive member.

According to various embodiments, when the first housing 410 and the second housing 420 are opened by 180 degrees, the first surface 411 and the third surface 421 may be formed in a planar structure facing the same direction (e.g., the Z-axis direction of FIG. 3). According to an embodiment, the electronic device 400 may include a display 430 (e.g., flexible display) disposed to cross the first surface 411 of the first housing 410 and the third surface 421 of the second housing 420. For example, when the first surface 411 of the first housing 410 and the third surface 421 of the second housing 420 are folded to face each other, the display 430 may also be folded to face each other based on the folding axis A. According to an embodiment, in at least a portion of the first surface 411 of the first housing 410, the display 430 may not be disposed and a separate sensor area 435 may be disposed. In another embodiment, the sensor area 435 may be disposed in at least a partial area of the third surface 421 of the second housing 420 or may be disposed to extend to the first surface 411 and the third surface 421.

According to various embodiments, the electronic device 400 may include a battery pack 500. According to an embodiment, the battery pack 500 may include a battery cell 510 disposed to extend from a first space of the first housing 410 to a second space of the second housing 420 and a protective circuit module (PCM) unit 520 disposed at one side of the battery cell 520. According to an embodiment, the battery cell 510 is a single cell, and may include a first cell area C1 in which a plurality of base portions including a mixture layer disposed in a first space of the first housing 410 are stacked, and a second cell area C2 including a mixture layer disposed in a second space of the second housing 420. According to an embodiment, the first cell area C1 and the second cell area C2 may be integrally connected through a foldable area B formed by bonding of a base portions in which a mixture layer is omitted. According to an embodiment, the foldable area B may be disposed in an area corresponding to the hinge module 460.

According to various embodiments, the battery cell 510 may be configured to naturally fold by at least 180 degrees without stress for folding even in a state in which the first surface 411 of the first housing 410 and the third surface 421 of the second housing 420 are folded to face through the foldable area B. According to one embodiment, the foldable area B of the battery cell 510 induces natural folding only by bonding of base portions having different lengths and in which the mixture layer is removed; thus, a separate additional process for forming the foldable area may not be required.

Here, the mixture layer refers to a portion in which a slurry including a material such as a conductive agent or a binder, as well as an active material contributing to a capacity, is applied or coated on a base portion (e.g., metal sheet).

Figure 5:
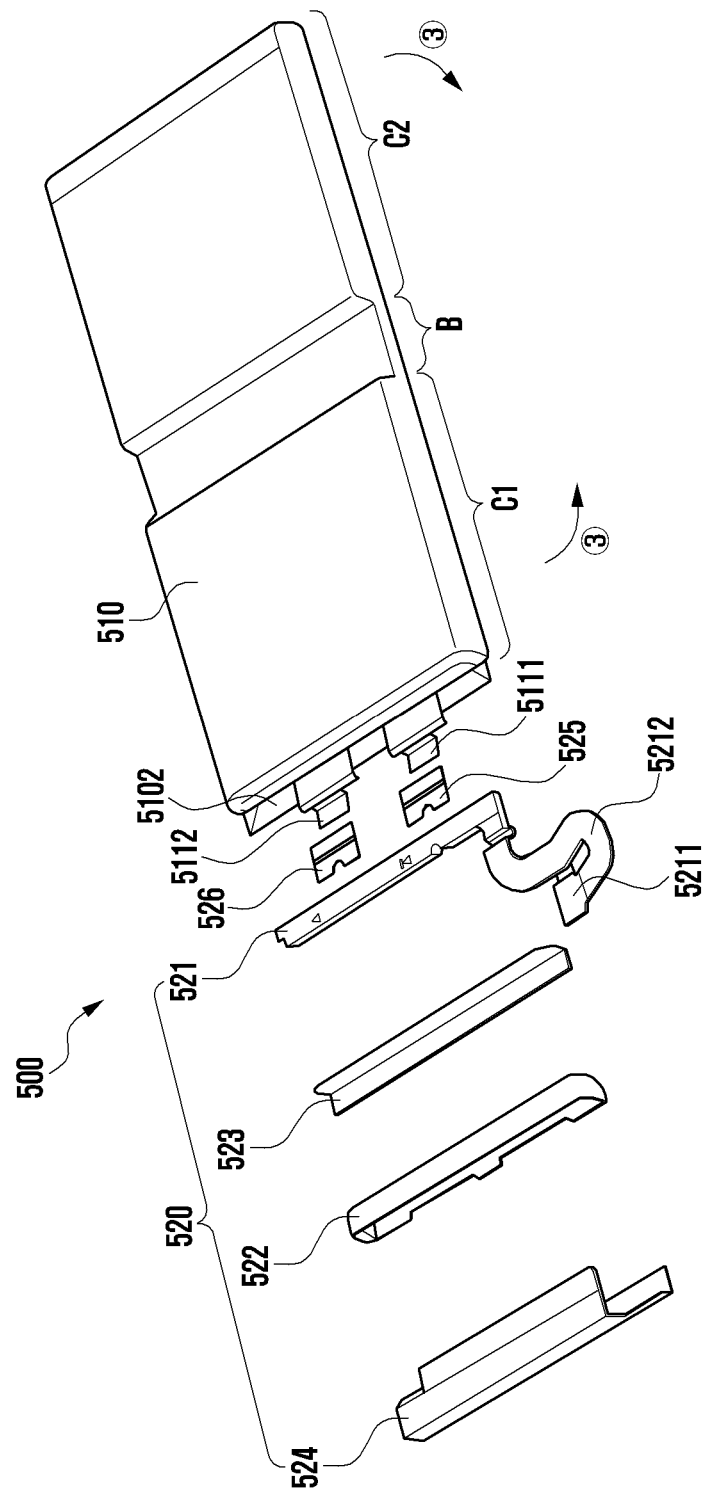
FIG. 5 is an exploded perspective view of a battery pack according to various embodiments of the disclosure.

FIG. 5 is an exploded perspective view of a battery pack 500 according to various embodiments of the disclosure.

Referring to FIG. 5, the battery pack 500 may include a battery cell 510 and a protective circuit module (PCM) unit 520 disposed at one side of the battery cell 510 and electrically connected to the battery cell 510. According to one embodiment, the PCM unit 520 may be electrically connected to conductive terminals 5111 and 5112 drawn out from a battery pouch (e.g., a battery pouch 5101 of FIG. 6) forming an outer surface of the battery cell 510.

According to various embodiments, the battery cell 510 may include a first cell area C1, a second cell area C2 extended from the first cell area C1, and a foldable area B connecting the first cell area C1 and the second cell area C2. According to an embodiment, sizes of the first cell area C1 and the second cell area C2 may be determined to be the same as or different from each other according to a position of the foldable area B. According to an embodiment, the PCM unit 520 may be drawn out from at least a portion of the first cell area C1. In another embodiment, the PCM unit 520 may be drawn out from at least a portion of the second cell area C2. According to an embodiment, the first cell area C1 and the second cell area C2 may be formed in a plate type stacked with a plurality of base portions (e.g., base portions 511 and 512 of FIG. 6) to be described later and including mixture layers (e.g., mixture layers 513 and 514 of FIG. 6) applied to one surface or both surfaces. According to an embodiment, the plurality of base portions may include positive electrode base portions (e.g., positive electrode base portions 511 of FIG. 6) and negative electrode base portions (e.g., negative electrode base portions 512 of FIG. 6). According to an embodiment, the positive electrode base portions and the negative electrode base portions may be alternately stacked while being electrically disconnected through separators (e.g., separators 515a, 515b, 515c, 515d, and 515e of FIG. 6). According to an embodiment, the foldable area B may be formed as a flexible area including a bonding portion whose at least some areas are bonded together with the separator while the mixture layer is omitted in the above-described base portions. According to an embodiment, the separator and the base portions of the foldable area B are disposed to have different lengths, thereby providing flexibility in folding.

According to various embodiments, the PCM unit 520 may include a PCM 521, a case 522 for receiving the PCM 521, a coupling member 523 for performing a buffering action while fixing the case 522 to a battery pouch (e.g., the battery pouch 5101 of FIG. 6), and a closing member 524 for closing to cover together the battery pouch 5101 and the case 522 in which the PCM 521 is received. According to an embodiment, the battery cell 510 may include a pouch terrace 5102 extended from the battery pouch 510 and that contributes to a part of a sealing portion for controlling the battery cell filled with an electrolyte (e.g., lithium salt-containing non-aqueous electrolyte). According to an embodiment, the pouch terrace 5102 may be used as a contact or fixed area of the case 522 in which the PCM 521 is received. According to an embodiment, the battery pouch 5101 may be made of a material such as cast coated paper (CCP), aluminum, or nylon. According to an embodiment, the pouch terrace 5102 may be sealed through a method such as heat or laser.

According to various embodiments, the battery pouch 510 may include a pair of conductive terminals 5111 and 5112 exposed through the pouch terrace 5101 and electrically connected to the internal base portions. According to an embodiment, the conductive terminals 5111 and 5112 may include a positive electrode terminal 511 electrically connected to the positive electrode base portions and a negative electrode terminal 512 electrically connected to the negative electrode base portions.

According to various embodiments, the PCM 521 may include one or more circuit elements capable of electrically protecting the battery cell 510 and a circuit board (e.g., printed circuit board (PCB)) in which the circuit elements may be mounted, and may be electrically connected to the conductive terminals 5111 and 5112 drawn out from the pouch terrace 5102 through conductive plates 525 and 526 (e.g., nickel plate). According to an embodiment, the PCM 521 may be used for maintaining a voltage in a predetermined range (e.g., for preventing overcharging or overdischarging) during charging and discharging of the battery cell 510. For example, when the battery cell 510 is a lithium battery, the PCM 520 may control a cell voltage in a range of 2V to 4.2V to prevent the battery cell 510 from being damaged.

Figure 6:
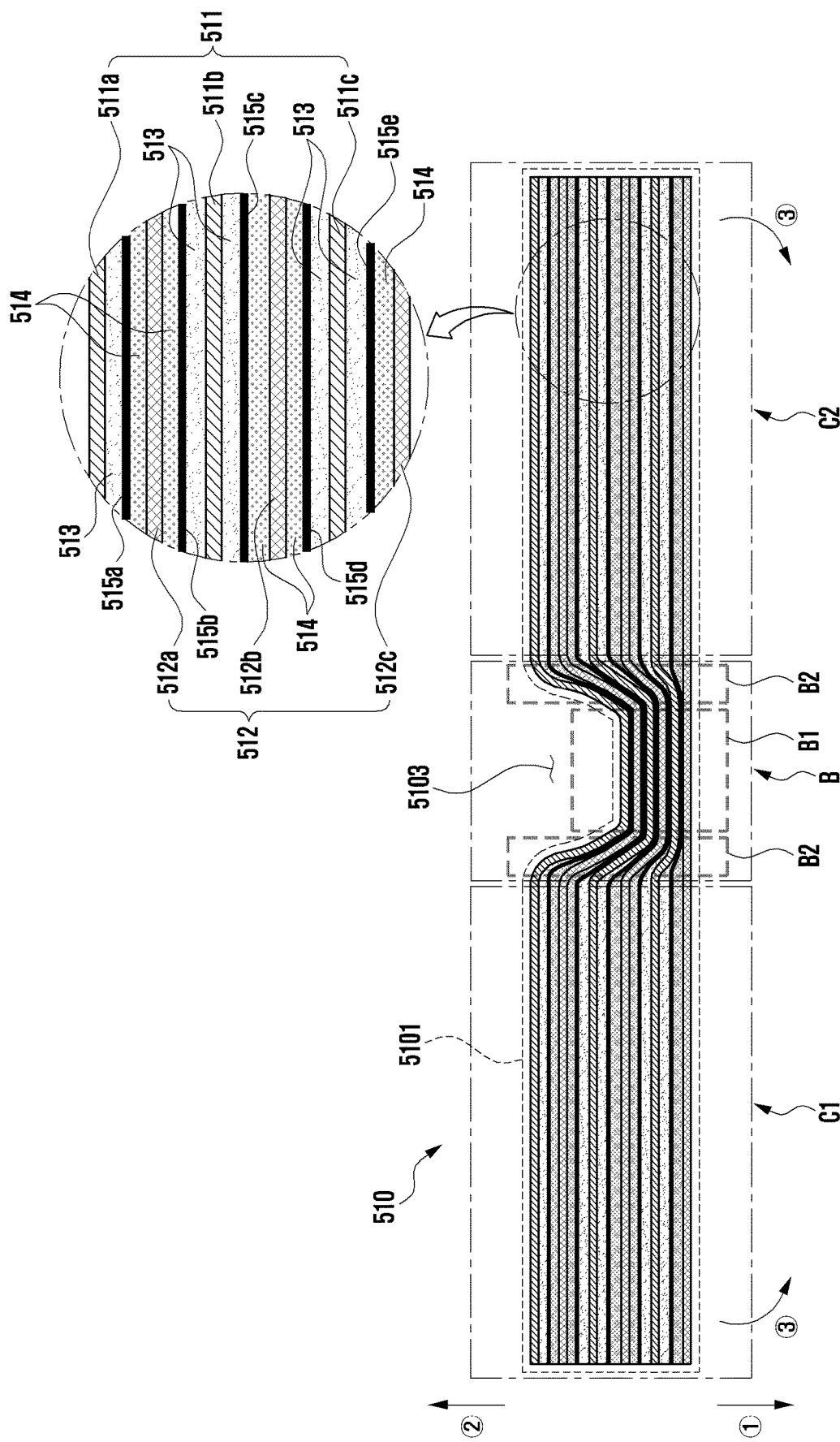
FIG. 6 is a cross-sectional view illustrating a configuration of a battery cell according to various embodiments of the disclosure.

FIG. 6 is a cross-sectional view illustrating a configuration of a battery cell 510 according to various embodiments of the disclosure.

Referring to FIG. 6, the battery cell 510 may include a plurality of stacked base portions 511 and 512 (e.g., current collectors). According to an embodiment, the plurality of base portions 511 and 512 may include positive electrode base portions 511a, 511b, and 511c and negative electrode base portions 512a, 512b, and 512c. According to one embodiment, as illustrated, in the positive electrode base portions 511a, 511b, and 511c and the negative electrode base portions 512a, 512b, and 512c, three layers are alternately stacked, but layers more than three layers may be stacked. According to an embodiment, the positive electrode base portions 511a, 511b, and 511c and the negative electrode base portions 512a, 512b, and 512c may be alternately stacked through the separators 515a, 515b, 515c, 515d, and 151e for electrical disconnection. According to an embodiment, each of the positive electrode base portions 511a, 511b, and 511c may be made of a plate-shaped metal material having high conductivity such as aluminum, stainless steel, nickel, titanium, or calcined carbon. According to an embodiment, each of the negative electrode base portions 512a, 512b, and 512c may be made of a plate-shaped metal material having high conductivity such as copper, stainless steel, aluminum, nickel, titanium, or calcined carbon.

According to various embodiments, each of the plurality of base portions 511 and 512 may include mixture layers 513 and 514 applied to one surface or both surfaces. According to an embodiment, the mixture layers 513 and 514 may be formed with a mixture of an active material, a conductive agent, and a binder or may be formed by adding a filler to the mixture. According to an embodiment, the mixture layers 513 and 514 may include a positive electrode mixture layer 513 (e.g., positive electrode active material) applied to the positive electrode base portions 511a, 511b, and 511c and a negative electrode mixture layer 514 (e.g., negative electrode active material) applied to the negative electrode base portions 512a, 512b, and 512c. According to an embodiment, the positive electrode active material used in the positive electrode mixture layer 513 may include lithium cobalt oxide, lithium nickel oxide, lithium manganese oxide, or lithium copper oxide. According to an embodiment, the negative active material used in the negative electrode mixture layer 514 may include hard carbon, graphite-based carbon, lithium metal, lithium alloy, silicon-based alloy, or tin-based alloy. According to an embodiment, as the separators 515a, 515b, 515c, 515d, and 515e, a thin film made of an insulating material having high ion permeability and mechanical strength may be used. According to an embodiment, the separators 515a, 515b, 515c, 515d, and 515e may include a sheet or a nonwoven fabric made of glass fiber, polyethylene, or an olefin-based polymer such as polypropylene having chemical resistance and hydrophobic properties.

According to various embodiments, the battery cell 510 may include a foldable area B in which the mixture layers 513 and 514 are omitted and in which only the base portions 511 and 512 and the separators 515a, 515b, 515c, 515d, and 515e are stacked. According to an embodiment, the battery cell 510 may include a first cell area C1 disposed at one side of the foldable area B and a second cell area C2 disposed at the other side thereof. According to an embodiment, when each of the plurality of base portions 511 and 512 is formed, the mixture layers 513 and 514 may be formed in a pattern manner to be applied to the first cell area C1 and the second cell area C2 except for the foldable area B. According to an embodiment, the foldable area B may include a bonding portion B1 in which the base portions 511 and 512 and the separators 515a, 515b, 515c, 515d, and 515e are bonded to each other while the mixture layers 513 and 514 are omitted and a non-bonding portion B2 for receiving the height difference between each layer generating by a step according to omission of the mixture layers 513 and 514 in the first cell area C1 and the second cell area C2 at both sides of the bonding portion B1. According to an embodiment, the bonding portion B1 may be formed through ultrasonic welding, bonding through an adhesive material, or thermocompression bonding process of each layer. In another embodiment, the foldable area B may be formed with only the non-bonding portion B2 without the bonding portion B1.

According to various embodiments, the plurality of base portions 511 and 512 and the separators 515a, 515b, 515c, 515d, and 515e may be disposed to have different lengths in the foldable area B. According to an embodiment, by providing different clearance lengths according to folding of the plurality of base portions 511 and the separators 515a, 515b, 515c, 515d, and 515e, a stress concentration phenomenon occurring by folding of the battery cell 510 can be solved, and a degree of freedom of folding can be guaranteed. According to an embodiment, the battery cell 510 may implement a folding operation at an angle of substantially 180 degrees or more through the foldable area B including the base portions 511 and the separators 515a, 515b, 515c, 515d, and 515e having different lengths. For example, when the first cell area C1 and the second cell area C2 are determined to be folded in a downward direction (e.g., direction ③) based on the foldable area B, the plurality of base portions 511 and 512 and the separators 515a, 515b, 515c, 515d, and 515e may be formed to gradually increase in length as rising in an upward direction (e.g., direction ②) in the foldable area B. In this case, the base portions 511c, 512b, 511b, 512a, and 511a and the separators 515e, 515d, 515c, 515d, and 515a, which are sequentially disposed at the upper side of the base portion 512c based on the base portion 512c disposed at the lowermost side of the battery cell 510 may have a bonding portion B positioned to be biased in a folding direction. Therefore, when all of the base portions 511 and 512 and the separators 515a, 515b, 515c, 515d, and 515e are bonded at the bonding portion B1 of the foldable area B, as illustrated, the bonding portion B1 may be biased in a direction (direction ③) in which the first cell area C1 and the second cell area C2 are folded, and a space 5103 may be provided thereon. According to an embodiment, when the foldable area B is folded, the space 5103 may be provided as a space for relieving stress. The space 5103 may be due to the fact that the mixture layers are omitted in the foldable area. For example, when the battery cell 510 is disposed in the electronic device 400 of FIG. 4A, the bonding portion B1 of the foldable area B1 disposed to be biased in a direction ① may be disposed to face the first surface 411 of the first housing 410 and the third surface 421 of the second housing 420 of the electronic device 400. In this case, by the space 5103 disposed to be biased in the direction ②, the electronic device may perform a folding operation in which the first surface 411 of the first housing 410 and the third surface 421 of the second housing 420 are folded to face each other.

Figure 7A:
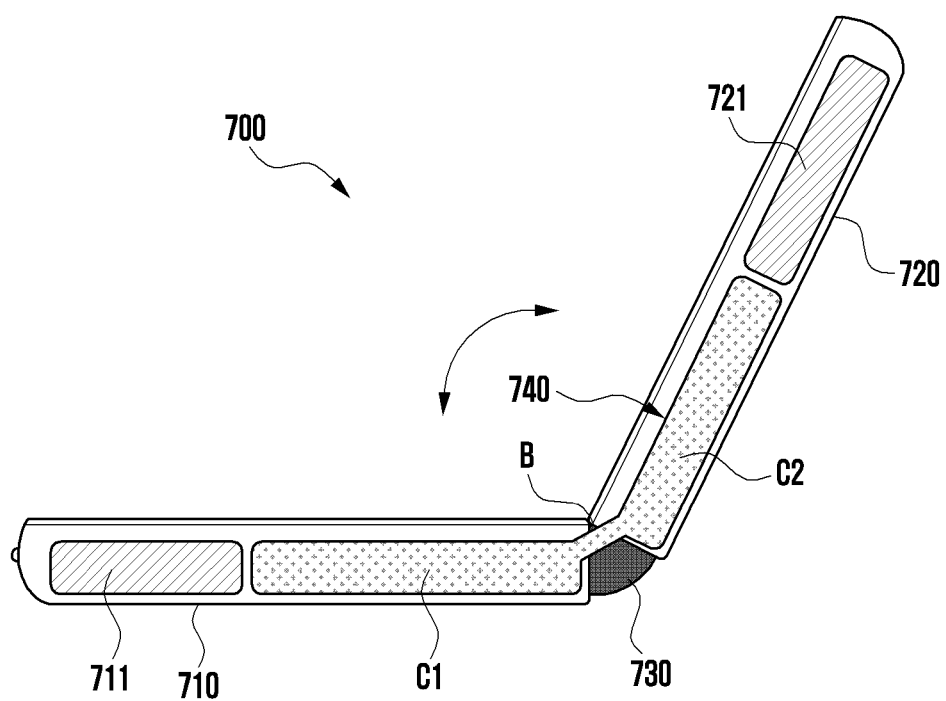
FIGS. 7A to 7C are diagrams illustrating various disposition configurations of battery cells applied to a foldable type electronic device according to various embodiments of the disclosure.
Figure 7B:
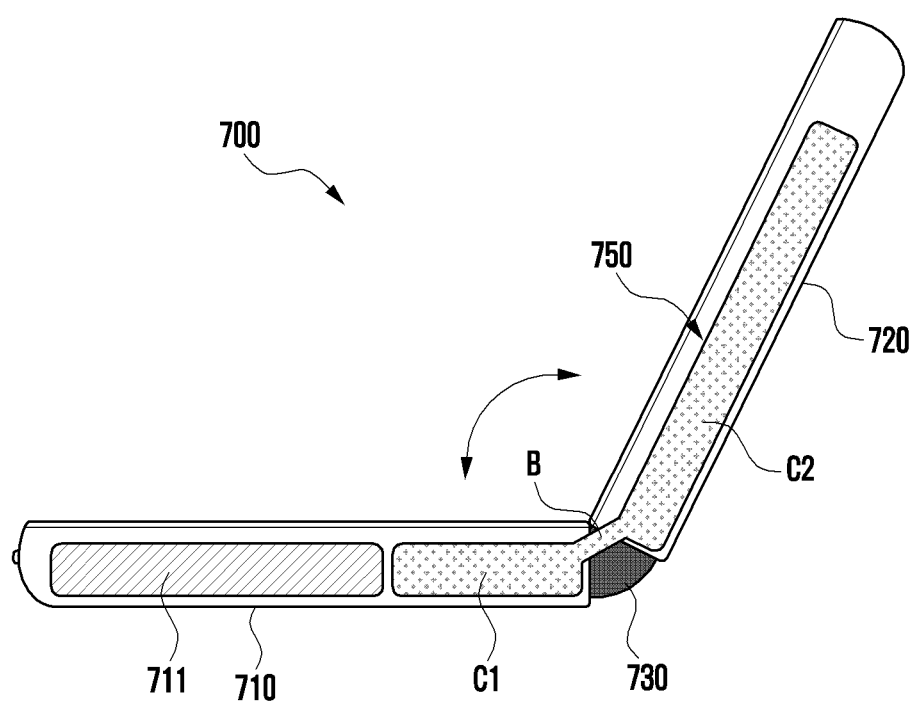
Figure 7C:
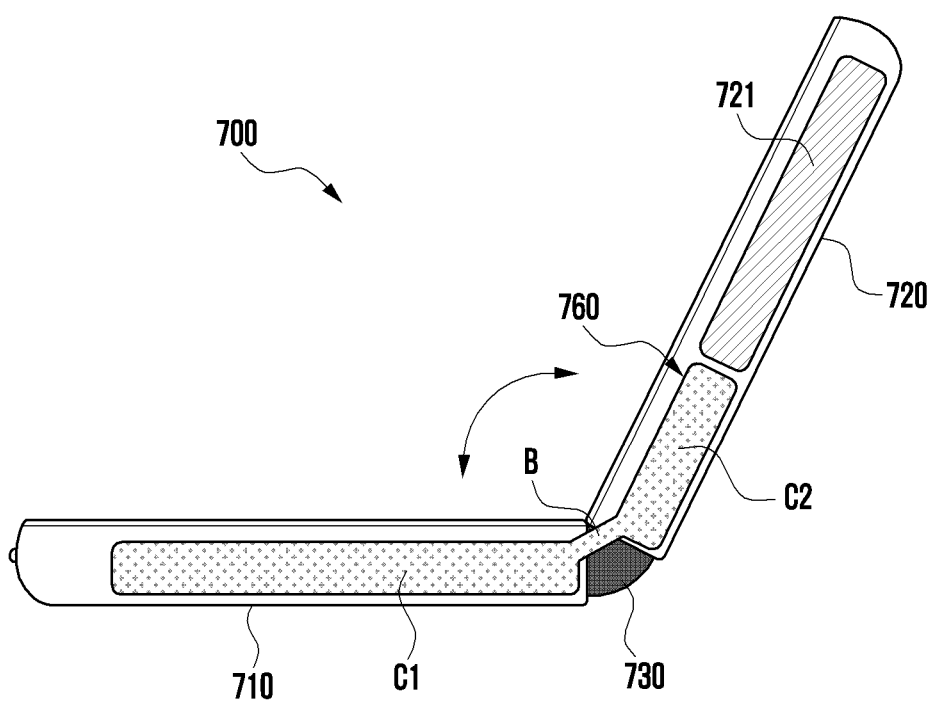

FIGS. 7A to 7C are diagrams illustrating various disposition configurations of battery cells 740, 750, and 760 applied to a foldable type electronic device 700 according to various embodiments of the disclosure.

The electronic device 700 of FIGS. 7A to 7C may be at least partially similar to the electronic device 101 of FIG. 1, the electronic device 200 of FIGS. 2A to 3, or the electronic device 400 of FIGS. 4A to 4B, or may further include other components of the electronic device.

Referring to FIGS. 7A to 7C, the electronic device 700 may include a first housing 710, a hinge module 730 connected to the first housing 710, and a second housing 720 connected to the hinge module 730. According to an embodiment, the first housing 710 and the second housing 720 may be disposed to be foldable to each other through the hinge module 730. According to an embodiment, a folding angle of the first housing 710 and the second housing 720 may include a range of 0 to 360 degrees. According to an embodiment, the battery cells 740, 750, and 760 may be disposed inside the electronic device 700. According to an embodiment, the battery cells 740, 750, and 760 may be disposed to be foldable to correspond to a folding operation of the first housing structure 710 and the second housing structure 720. For example, the battery cells 740, 750, and 760 may include a first cell area C1 disposed in the first housing 710, a second cell area C2 disposed in the second housing 720, and a foldable area B connecting the first cell area C1 and the second cell area C2. For example, the battery cells 710, 750, and 760 are single cells and may have substantially the same configuration as that of the battery cell 510 of FIG. 6 described above.

Referring to FIG. 7A, the electronic device 700 may include a pair of printed circuit boards 711 and 721 disposed in an internal space. According to an embodiment, the printed circuit boards 711 and 721 may include the first printed circuit board 711 disposed at the first housing 710 and the second printed circuit board 721 disposed at the second housing 720. According to an embodiment, the battery cell 740 may be operated as a battery pack (e.g., the battery pack 500 of FIGS. 4A to 4B) including a PCM unit (e.g., the PCM unit 520 of FIGS. 4A to 4B), and the PCM unit (e.g., the PCM unit 520 of FIGS. 4A to 4B) may be electrically connected to the first printed circuit board 711 or the second printed circuit board 721 as needed. According to an embodiment, the first printed circuit board 711 and the second printed circuit board 721 may have the same size. In this case, the first cell area C1 and the second cell area C2 may be also formed in the same size. According to an embodiment, the first printed circuit board 711 and the second printed circuit board 721 may have different sizes. In this case, the first cell area C1 and the second cell area C2 may be formed in different sizes to correspond thereto.

Referring to FIG. 7B, the electronic device 700 may include only a first printed circuit board 711 disposed at the first housing 710. In this case, the first cell area C1 of the battery cell 750 may be configured to be smaller than the second cell area C2 by disposition of the first printed circuit board 711.

Referring to FIG. 7C, the electronic device 700 may include only the second printed circuit board 721 disposed at the second housing 720. In this case, the second cell area C2 of the battery cell 760 may be configured to be smaller than the first cell area C1 by disposition of the second printed circuit board 721.

Figure 8A:
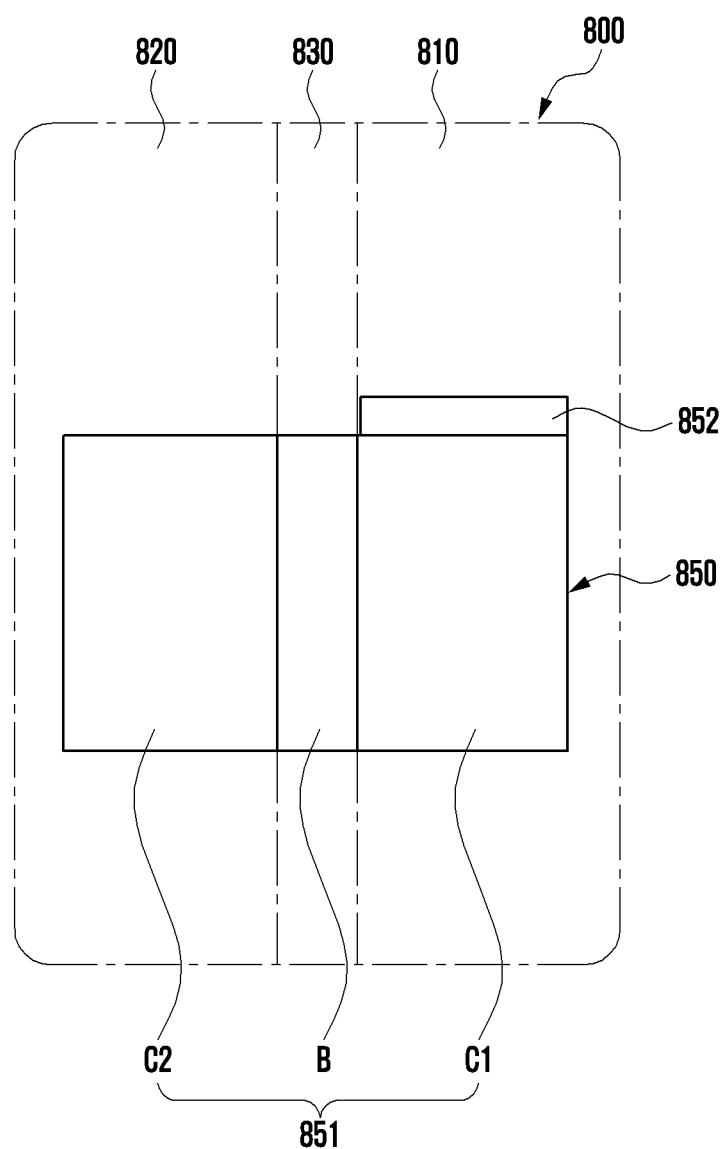
FIGS. 8A to 8C are diagrams illustrating a disposition configuration of a PCM unit of a battery pack according to various embodiments of the disclosure.
Figure 8B:
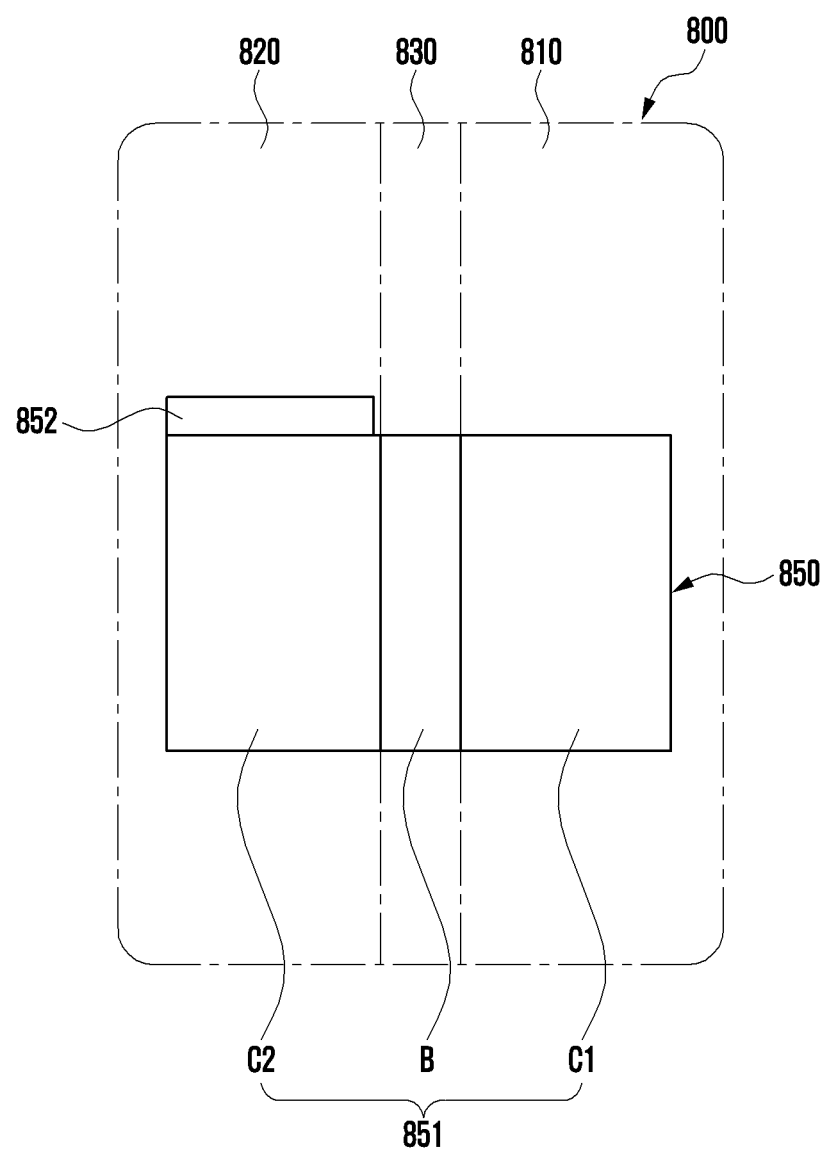
Figure 8C:
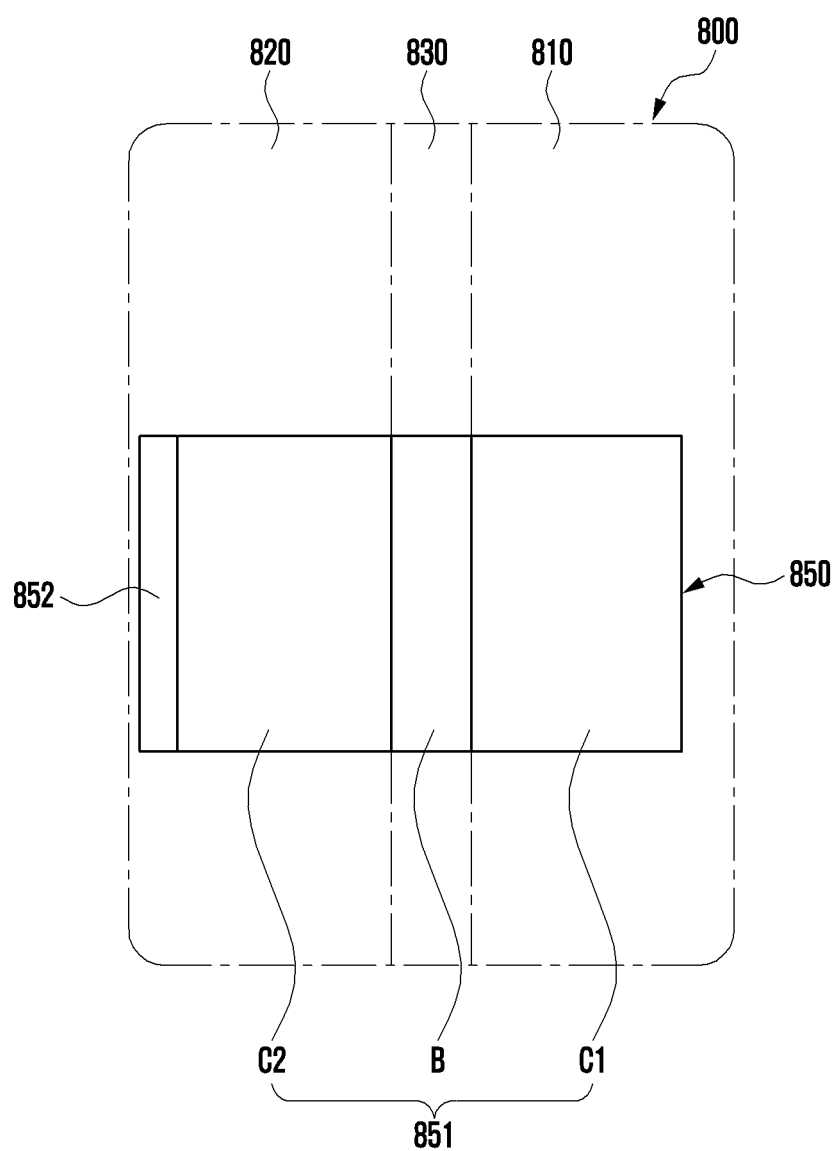

FIGS. 8A to 8C are diagrams illustrating a disposition configuration of a PCM unit 852 of a battery pack 850 according to various embodiments of the disclosure.

An electronic device 800 of FIGS. 8A to 8C may be at least partially similar to the electronic device 101 of FIG. 1, the electronic device 200 of FIGS. 2A to 3, or the electronic device 400 of FIGS. 4A to 4B, or may further include other components of the electronic device.

Referring to FIGS. 8A to 8C, the electronic device may include a first housing 810, a hinge module 830 connected to the first housing 810, and a second housing 820 connected to the hinge module 830. According to an embodiment, the first housing 810 and the second housing 820 may be disposed to be folded to each other through the hinge module 830. According to an embodiment, a folding angle of the first housing 810 and the second housing 820 may include 0 to 360 degrees.

According to various embodiments, the electronic device 800 may include a battery pack 850 disposed therein. According to an embodiment, the battery pack 850 is a single cell and may include a battery cell 851 including a first cell area C1 disposed at the first housing 810 of the electronic device, a foldable area B connected to the first cell area C1 and disposed to be foldable at a position corresponding to the hinge module 830, and a second cell area C2 connected to the foldable area B and disposed at the second housing 820. According to an embodiment, the battery pack 850 may include a PCM unit 852 disposed at a part of the battery cell 851. As described above, the PCM unit 852 (e.g., the PCM unit 520 of FIGS. 4A to 4B) may be disposed to face a right side direction of the first housing 410 of the first cell area C1 of the battery cell 510, as illustrated in FIGS. 4A to 4B. In another embodiment, the PCM unit 852 may be disposed to face an upper side direction of the first housing 810 of the first cell area C1 of the battery cell 851, as illustrated in FIG. 8A. In another embodiment, the PCM unit 852 may be disposed to face an upper side direction of the second housing 820 of the second cell area C2 of the battery cell 851, as illustrated in FIG. 8B. In another embodiment, the PCM unit 852 may be disposed to face a left side direction of the second housing 820 of the second cell area C2 of the battery cell 851, as illustrated in FIG. 8C. For example, the PCM unit 850 may be disposed to reduce a power transmission loss as much as possible at a nearest position according to the disposition of the printed circuit board (e.g., the printed circuit boards 711 and 721 of FIG. 7A) disposed at the electronic device 800.

Figure 9A:
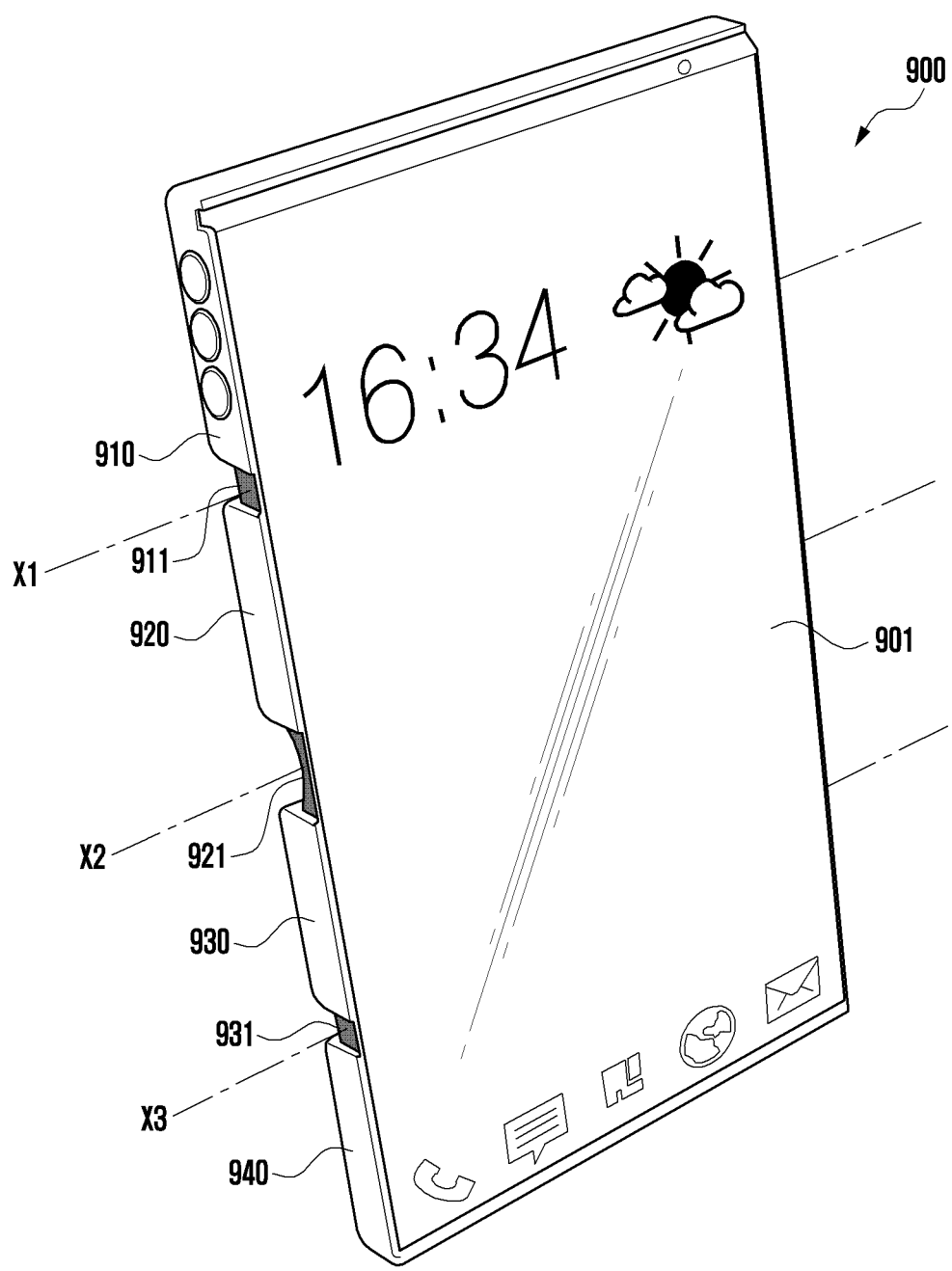
FIGS. 9A and 9B are diagrams illustrating a configuration of a foldable type electronic device according to various embodiments of the disclosure.
Figure 9B:
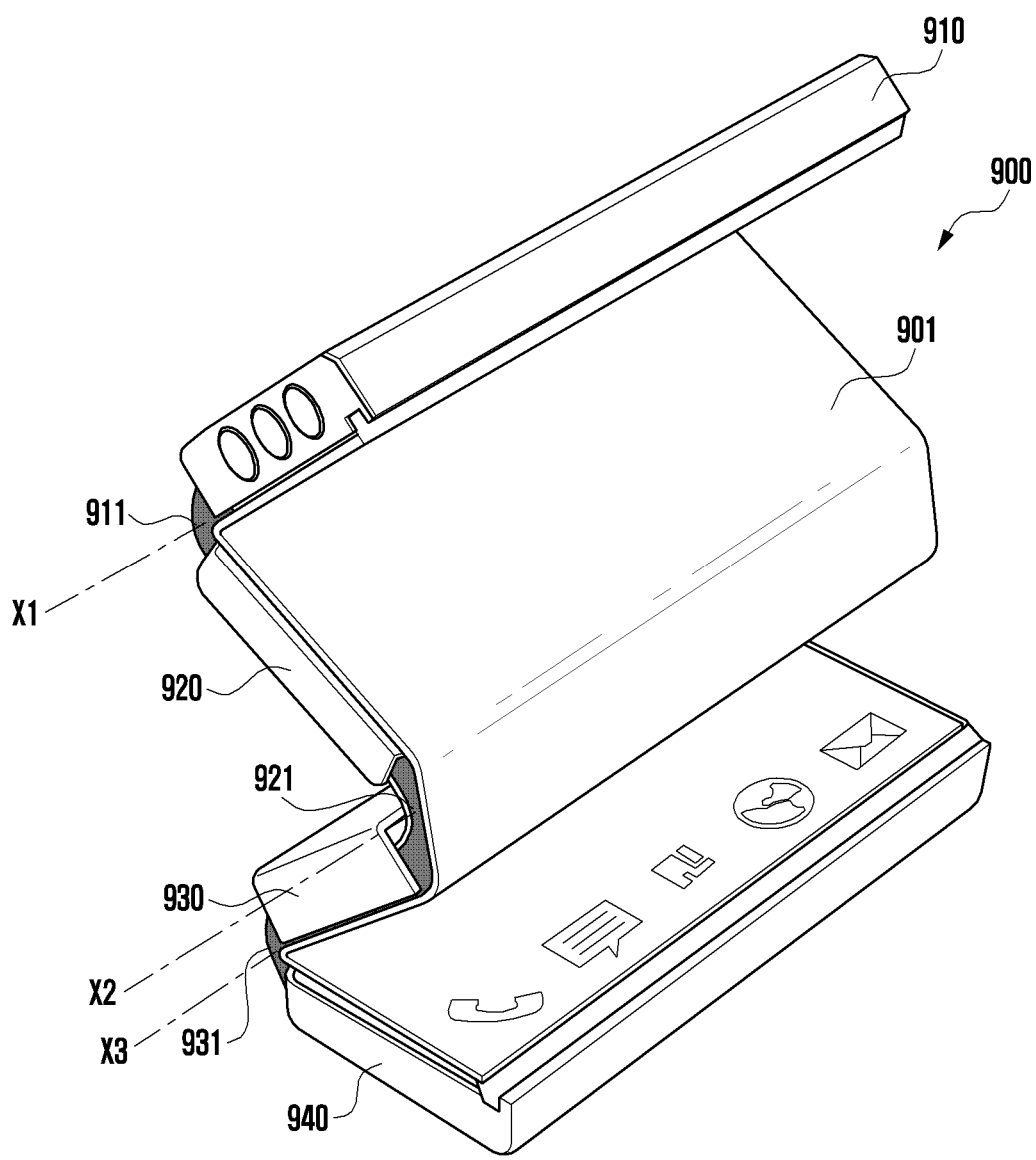

FIGS. 9A and 9B are diagrams illustrating a configuration of a foldable type electronic device 900 according to various embodiments of the disclosure.

An electronic device 9100 of FIGS. 9A and 9B may be at least partially similar to the electronic device 101 of FIG. 1 or may further include other components of the electronic device.

Referring to FIGS. 9A and 9B, the electronic device 900 is bent multiple times through a plurality of housings 910, 920, 930, and 940 and a plurality of hinge modules 911, 921, and 931 connecting each housing to enhance portability. According to an embodiment, the electronic device 900 may include a first housing 910, a second housing 920, a third housing 930, and a fourth housing 940. According to an embodiment, the electronic device 900 may include a first hinge module 911 for foldably connecting the first housing 910 and the second housing 920 to a first folding axis X1, a second hinge module 921 for foldably connecting the second housing 920 and the third housing 930 to a second folding axis X2, and a third hinge module 931 for foldably connecting the third housing 930 and the fourth housing 940 to a third folding axis X3. According to an embodiment, the first folding axis X1, the second folding axis X2, and the third folding axis X3 may be disposed parallel to each other. In another embodiment, at least one of the first folding axis X1, the second folding axis X2, or the third folding axis X3 may be disposed not parallel to the other folding axes. According to an embodiment, unlike that the electronic device (e.g., the electronic device 200 of FIG. 2A) illustrated in FIG. 2A performs a folding operation based on a vertical folding axis A, the electronic device 900 according to the present embodiment may perform a horizontal axis folding operation based on at least one of the first folding axis X1, the second folding axis X2, or the third folding axis X3. According to an embodiment, when all of the first housing 910, the second housing 920, the third housing 930, and the fourth housing 940 are unfolded, the electronic device 900 may include a display 901 disposed to cross each housing. According to an embodiment, when the first housing 910, the second housing 920, the third housing 930, and the fourth housing 940 are folded to each other, the display 901 may include a flexible display that may be folded correspondingly thereto.

Figure 10A:
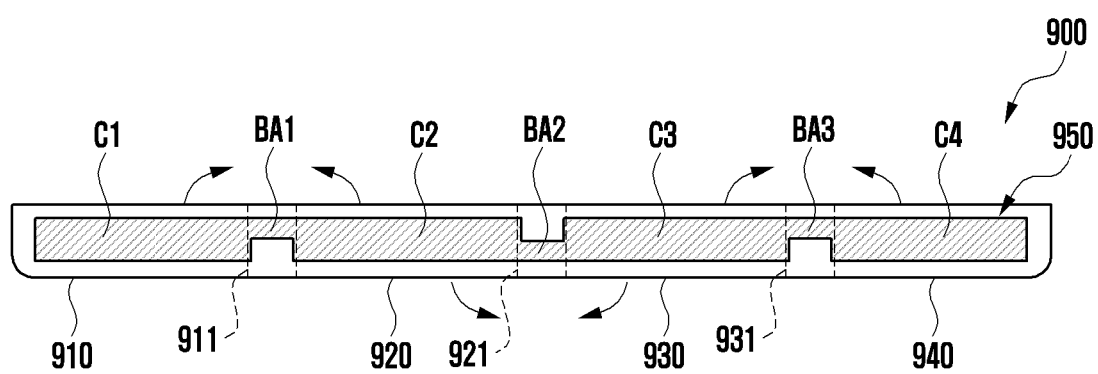
FIG. 10A is a diagram illustrating a configuration of a battery cell disposed in the foldable type electronic device of FIG. 9A according to various embodiments of the disclosure.
Figure 10B:
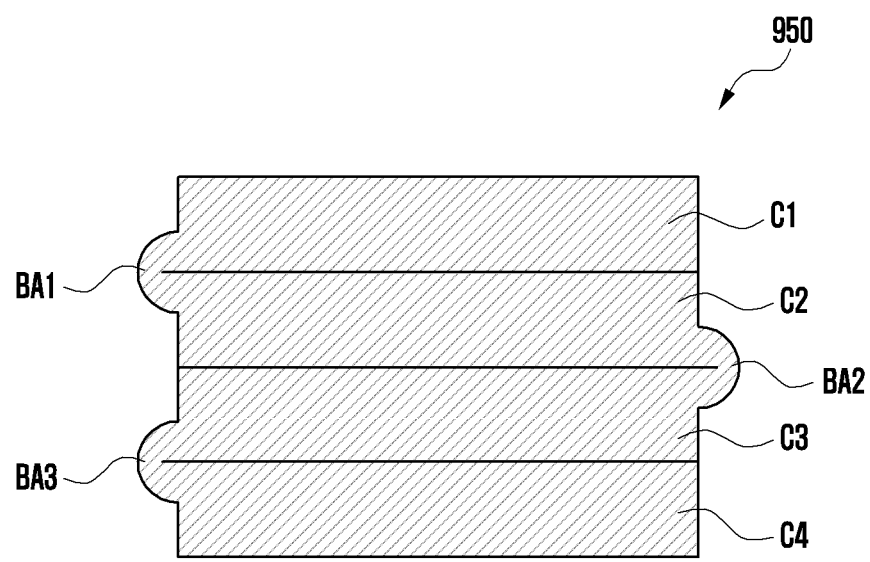
FIG. 10B is a diagram illustrating a folded state of the battery cell of FIG. 10A according to various embodiments of the disclosure.

FIG. 10A is a diagram illustrating a configuration of a battery cell 950 disposed in the foldable type electronic device 900 of FIG. 9A according to various embodiments of the disclosure. FIG. 10B is a diagram illustrating a folded state of the battery cell 950 of FIG. 10A according to various embodiments of the disclosure. Although not illustrated, the battery cell 950 may be a partial component of a battery pack including a PCM unit electrically connected to a printed circuit board disposed in an internal space of at least one of the first housing 910, the second housing 920, the third housing 930, and the fourth housing 940 of the electronic device.

Referring to FIGS. 10A and 10B, the battery cell 950 is a single cell and may include a first cell area C1 disposed in the first housing 910, a second cell area C2 disposed in the second housing 920, a third cell area C3 disposed in the third housing 930, and a fourth cell area C4 disposed in the fourth housing 940. According to an embodiment, the battery cell 950 may include a first foldable area BA1 that connects the first cell area C1 and the second cell area C2 and disposed to be foldable, a second foldable area BA2 that connects the second cell area C2 and the third cell area C3 and disposed to be foldable, and a third foldable area BA3 that connects the third cell area C3 and the fourth cell area C4 and disposed to be foldable. According to an embodiment, the first, second, and third foldable areas BA1, BA2, and BA3 may have substantially the same configuration as that of the foldable area B of FIG. 6.

According to various embodiments, when the first housing 910, the second housing 920, the third housing 930, and the fourth housing 940 are folded by the corresponding hinge modules 911, 921, and 931, the battery cell may be folded together. For example, when the electronic device 900 is folded, the first cell area C1 and the second cell area C2 of the battery cell 950 may be folded by 180 degrees to face each other through the first foldable area BA1, the second cell area C2 and the third cell area C3 may be folded by 180 degrees to face each other through the second foldable area BA2, and the third cell area C3 and the fourth cell area C4 may be folded by 180 degrees to face each other through the third foldable area BA3.

Figure 11:
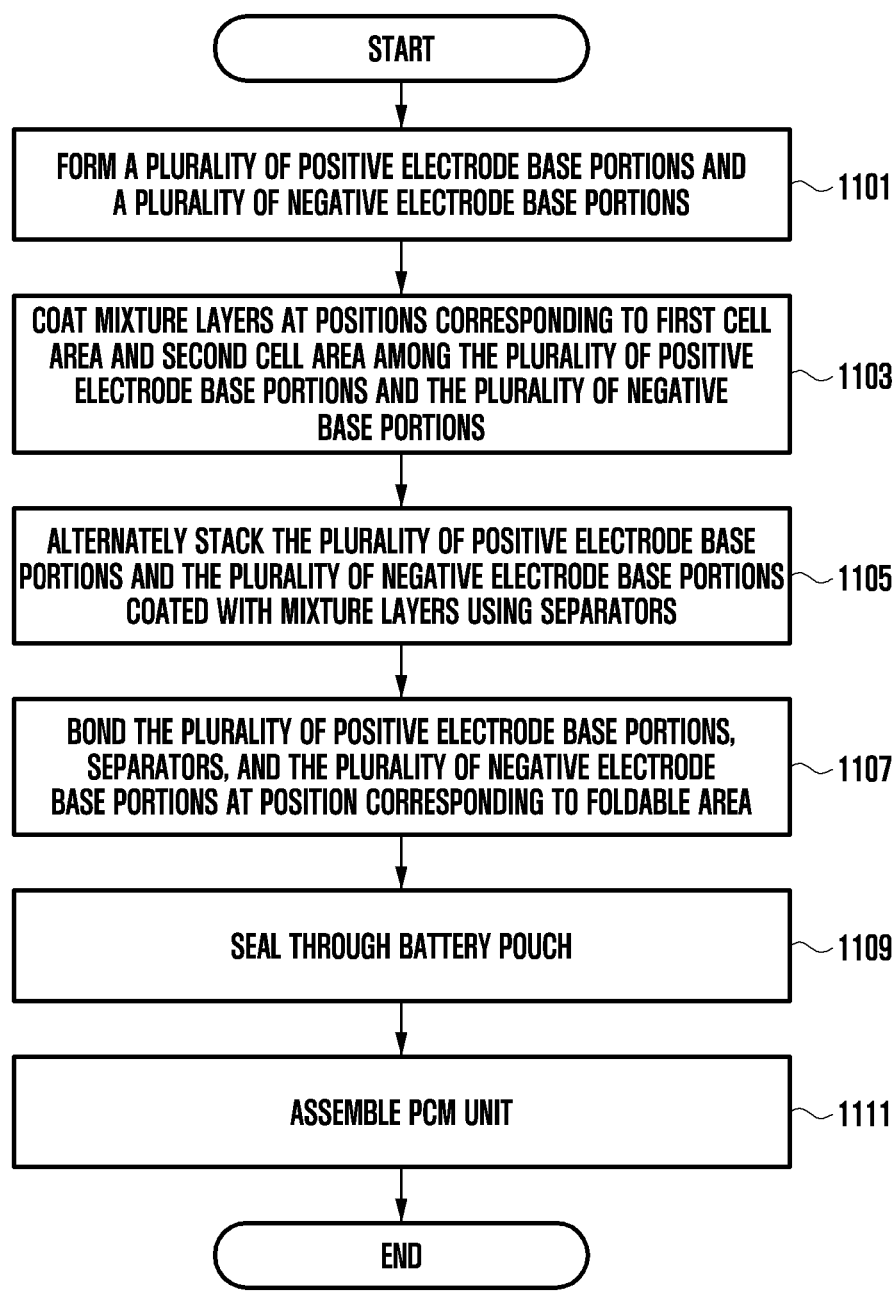
FIG. 11 is a flowchart illustrating a production process of a battery cell according to various embodiments of the disclosure.

FIG. 11 is a flowchart illustrating a production process of a battery cell according to various embodiments of the disclosure.

Referring to FIGS. 11 and 6, in operation 1101, a plurality of positive electrode base portions 511 and a plurality of negative electrode base portions 512 may be formed. According to an embodiment, each of the plurality of positive electrode base portions 511 and the plurality of negative electrode base portions 512 may be formed with a metal sheet for a plate-shaped current collector. According to an embodiment, the plurality of positive electrode base portions 511 may be made of a plate-shaped metal material having high conductivity, such as aluminum, stainless steel, nickel, titanium, or calcined carbon. According to an embodiment, the plurality of negative electrode base portions 512 may be made of a plate-shaped metal material having high conductivity, such as copper, stainless steel, aluminum, nickel, titanium, or calcined carbon. According to an embodiment, the plurality of positive electrode base portions 511 and the plurality of negative electrode base portions 512 may include a material modified to increase tensile strength through doping of a heterogeneous metal alloy, metal, or conductive polymer.

Thereafter, in operation 1103, the mixture layers 513 and 514 may be coated at positions corresponding to the first cell area C1 and the second cell area C2 among the plurality of positive electrode base portions 511 and the plurality of negative base portions 512. According to an embodiment, the mixture layers 513 and 514 may be formed with a mixture of an active material, a conductive agent, and a binder or may be formed by adding a filler to the mixture. According to an embodiment, a positive electrode active material used in the positive electrode mixture layer 513 may include lithium cobalt oxide, lithium nickel oxide, lithium manganese oxide, or lithium copper oxide. According to an embodiment, a negative active material used in the negative electrode mixture layer 514 may include hard carbon, graphite-based carbon, lithium metal, lithium alloy, silicon-based alloy, or tin-based alloy. According to an embodiment, the mixture layers 513 and 514 may be formed in a pattern manner so as to be disposed only at positions corresponding to the first cell area C1 and the second cell area C2 except for the foldable area. According to an embodiment, the foldable area B in which the mixture layers 513 and 514 are not disposed may be formed to have a range of 3 to 30% of a total width of the battery cell 510.

Thereafter, in operation 1105, the plurality of positive electrode base portions 511 and the plurality of negative electrode base portions 512 coated with the mixture layers 513 and 514 may be alternately stacked using the separators 515a, 515b, 515c, 515d, and 515e. According to an embodiment, as the separators 515a, 515b, 515c, 515d, and 515e, a thin film made of an insulating material having high ion permeability and mechanical strength may be used. According to an embodiment, the separators 515a, 515b, 515c, 515d, and 515e may include a sheet or a nonwoven fabric made of glass fiber, polyethylene, or an olefin-based polymer such as polypropylene having chemical resistance and hydrophobic properties.

Thereafter, in operation 1107, the plurality of positive electrode base portions 511, the separators 515a, 515b, 515c, 515d, and 515e, and the plurality of negative electrode base portions 512 may be bonded to each other at a position corresponding to the foldable area B. According to an embodiment, the separators 515a, 515b, 515c, 515d, and 515e, a plurality of positive electrode base portions 511, and a plurality of negative electrode base portions 512 may be attached through bonding, thermal bonding, or ultrasonic welding.

Thereafter, in operation 1109, the plurality of positive electrode base portions 511 and the plurality of negative electrode base portions 512 stacked through the separators 515a, 515b, 515c, 515d, and 515e may be sealed through the battery pouch 5101. According to an embodiment, the plurality of positive electrode base portions 511 and the plurality of negative electrode base portions 512 may be included in the battery pouch 5101 through an electrolyte and be kept in a sealed state. According to an embodiment, the battery pouch 5101 may include a material having high tensile strength and modified through polymer doping or surface treatment. According to an embodiment, the battery pouch 5101 may seal the electrolyte by forming or folding. According to an embodiment, the electrolyte may include a lithium salt-containing non-aqueous electrolyte.

In operation 1111, the PCM unit (e.g., the PCM unit 510 of FIG. 4A) may be assembled in the battery cell 520. According to an embodiment, at least a portion of the PCM unit is drawn out from the battery pouch 5101, and the PCM unit (e.g., the PCM unit 520 of FIG. 4A) may be electrically connected through conductive terminals (e.g., the conductive terminals 5111 and 5112 of FIG. 5) electrically connected to the plurality of internal base portions 511 and 512. According to an embodiment, the PCM unit (e.g., the PCM unit 520 of FIG. 4A) may be disposed at various positions of the battery cell 510 in consideration of a disposition position of at least one printed circuit board (e.g., the printed circuit boards 711 and 712 of FIG. 7A) disposed inside the electronic device.

An electronic device (e.g., the electronic device 400 of FIG. 4A) may include a housing, wherein the housing includes a hinge module (e.g., the hinge module 460 of FIG. 4A); a first housing (e.g., the first housing 410 of FIG. 4A) including a first surface (e.g., the first surface 411 of FIG. 4A) connected to the hinge module and facing in a first direction, a second surface (e.g., the second surface 412 of FIG. 4A) facing in a second direction opposite to the first direction, and a first side member (e.g., the first side member 413 of FIG. 4A) enclosing at least a portion of a first space between the first surface and the second surface; a second housing including a third surface (e.g., the third surface 421 of FIG. 4A) connected to the hinge module and facing in a third direction, a fourth surface (e.g., the fourth surface 422 of FIG. 4A) facing in a fourth direction opposite to the third direction, and a second side member (e.g., the second side member 423 of FIG. 4A) enclosing at least a portion of a second space between the third surface and the fourth surface, wherein the second housing is folded with the first housing around the hinge module, wherein the first surface faces the third surface in a folded state, and the third direction is the same as the first direction in an unfolded state; at least one printed circuit board (e.g., the printed circuit boards 711 and 721 of FIG. 7A) disposed in an internal space of the housing; and a battery pack (e.g., the battery pack 500 of FIG. 4A), wherein the battery pack includes a battery cell (e.g., the battery cell 510 of FIG. 4A), wherein the battery cell includes a first cell area (e.g., the first cell area C1 of FIG. 4A) disposed through the first space; a second cell area (e.g., the second cell area C2 of FIG. 4A) extended from the first cell area and disposed through the second space; and a foldable area (e.g., the foldable area B of FIG. 4A) connecting the first cell area and the second cell area; a plurality of base portions (e.g., the base portions 511 and 512 of FIG. 6) stacked to extend from the first cell area to the second cell area through the foldable area and disposed to be electrically insulated through separators (e.g., the separators 515a, 515b, 515c, 515d, and 515e of FIG. 6); and mixture layers (e.g., the mixture layers 513 and 514 of FIG. 6) applied to one surface or both surfaces of each of the plurality of base portions; and a PCM unit (e.g., the PCM unit 520 of FIG. 5) extended from at least a portion of the battery cell and disposed to be electrically connected to the printed circuit board, wherein in the foldable area, the mixture layers are omitted, and the foldable area includes a stacked structure of the plurality of base portions and the separators having different lengths.

According to various embodiments, the plurality of base portions and the separators may be formed to gradually decrease in length as advancing in a direction in which the first cell area and the second cell area are folded in the foldable area.

According to various embodiments, the foldable area may include a bonding portion (e.g., the bonding portion B1 of FIG. 6) in which at least a partial area of the separator and the plurality of base portions are bonded to each other; and a non-bonding portion (e.g., the non-bonding portion B2 of FIG. 6) disposed at both sides of the bonding portion and not bonded to each other.

According to various embodiments, the bonding portion may be disposed to be biased in a direction in which the first cell area and the second cell area are folded in the foldable area.

According to various embodiments, the foldable area may be formed to have a range of 3 to 30% of a total width of the battery cell.

According to various embodiments, the first cell area and the second cell area of the battery cell may have substantially the same size or have different sizes.

According to various embodiments, the at least one printed circuit board may be disposed in at least one of the first housing or the second housing, and the PCM unit may be electrically connected to at least one conductive terminal (e.g., the conductive terminals 5111 and 5112 of FIG. 5) drawn out from a cell area disposed in a housing in which the printed circuit board is disposed.

According to various embodiments, the base portions may include positive electrode base portions and negative electrode base portions alternately stacked through the separator.

According to various embodiments, each of the positive electrode base portions may be made of a plate-shaped metal material with high conductivity such as aluminum, stainless steel, nickel, titanium, or calcined carbon.

According to various embodiments, each of the negative electrode base portions may be made of a plate-shaped metal material having high conductivity such as copper, stainless steel, aluminum, nickel, titanium, or calcined carbon.

According to various embodiments, the mixture layer may be formed with a mixture of an active material, a conductive agent, and a binder or may be formed by adding a filler to the mixture.

According to various embodiments, the PCM unit may be disposed near the at least one printed circuit board.

According to various embodiments, the first cell area and the second cell area of the battery cell may operate to be folded in a range of 0 to 360 degrees according to a folded state of the first housing and the second housing.

According to various embodiments, the electronic device may further include a flexible display (e.g., the display 230 of FIG. 2A) disposed to cross the first surface and the third surface.

According to various embodiments, a battery pack (e.g., the battery pack 500 of FIG. 4A) disposed inside an electronic device, wherein the battery pack includes a battery cell (e.g., the battery cell 510 of FIG. 4A), wherein the battery cell includes a first cell area (e.g., the first cell area C1 of FIG. 4A) disposed through a first space; a second cell area (e.g., the second cell area C2 of FIG. 4A) extended from the first cell area and disposed through a second space; and a foldable area (e.g., the foldable area B of FIG. 4A) connecting the first cell area and the second cell area; a plurality of base portions (e.g., the base portions 511 and 512 of FIG. 6) stacked to extend from the first cell area to the second cell area through the foldable area and disposed to be electrically insulated through separators (e.g., the separators 515a, 515b, 515c, 515d, and 515e of FIG. 6); and mixture layers (e.g., the mixture layers 513 and 514 of FIG. 6) applied to one surface or both surfaces of each of the plurality of base portions; and a PCM unit (e.g., the PCM unit 520 of FIG. 5) extended from at least a portion of the battery cell and disposed to be electrically connected to a printed circuit board (e.g., the printed circuit boards 711 and 721 of FIG. 7A) of the electronic device (e.g., the electronic device 400 of FIG. 4A), wherein in the foldable area, the mixture layers are omitted, and the foldable area includes a stacked structure of the plurality of base portions and the separators having different lengths.

The embodiments of the disclosure disclosed in this specification and drawings only present a specific example in order to easily describe the technical contents according to an embodiment of the disclosure and to help an understanding of the embodiments of the disclosure, and they do not intend to limit the scope of the embodiments of the disclosure. Accordingly, all changes or modifications derived from the technical idea of various embodiments of the disclosure in addition to the embodiments described herein should be construed as being included in the scope of various embodiments of the disclosure without departing from the scope of the disclosure.

The invention claimed is:
1. An electronic device comprising:
a housing including a hinge component, a first housing, and a second housing, the first housing including a first surface connected to the hinge component and facing in a first direction, a second surface facing in a second direction opposite to the first direction, and a first side member enclosing at least a portion of a first space between the first surface and the second surface, the second housing including a third surface connected to the hinge component and facing in a third direction, a fourth surface facing in a fourth direction opposite to the third direction, and a second side member enclosing at least a portion of a second space between the third surface and the fourth surface, wherein the electronic device is folded with the first housing and the second housing moving about the hinge component, wherein the first surface faces the third surface in a folded state, and the third direction is a same direction as the first direction in an unfolded state;

at least one printed circuit board disposed in an internal space of the housing; and a battery pack including a battery cell and a protective circuit module (PCM) component, wherein the battery cell comprises:
- a first cell area disposed through the first space, a second cell area extended from the first cell area and disposed through the second space,
- a foldable area connecting the first cell area and the second cell area,
- a plurality of base portions stacked to extend from the first cell area to the second cell area through the foldable area and disposed to be electrically insulated through separators, and
- mixture layers applied to one surface or both surfaces of each of the plurality of base portions, wherein the PCM component extends from at least a portion of the battery cell and is electrically connected to the at least one printed circuit board, wherein the mixture layers are omitted in the foldable area and the foldable area includes a stacked structure of the plurality of base portions and the separators, wherein each of the plurality of base portions have different lengths from each other in the foldable area, and wherein each of the separators have different lengths from each other in the foldable area.

2. The electronic device of claim 1, wherein the plurality of base portions and the separators are formed to gradually decrease in length in a direction in which the first cell area and the second cell area are folded in the foldable area.

3. The electronic device of claim 2, wherein the foldable area comprises:
- a bonding portion in which at least a partial area of the separators and the plurality of base portions are bonded to each other; and
- a non-bonding portion disposed at both sides of the bonding portion and not bonded to each other.

4. The electronic device of claim 3, wherein the bonding portion is disposed to be biased in a direction in which the first cell area and the second cell area are folded in the foldable area.

5. The electronic device of claim 1, wherein the foldable area is formed to have a range of 3 to 30% of a total width of the battery cell.

6. The electronic device of claim 1, wherein the first cell area and the second cell area of the battery cell have substantially a same size.

7. The electronic device of claim 6,
wherein the at least one printed circuit board is disposed in at least one of the first housing or the second housing, and
wherein the PCM component is electrically connected to at least one conductive terminal drawn out from a cell area disposed in the housing in which the at least one printed circuit board is disposed.

8. The electronic device of claim 1, wherein the base portions include positive electrode base portions and negative electrode base portions alternately stacked through the separators.

9. The electronic device of claim 8,
wherein each of the positive electrode base portions is made of a plate-shaped metal material with high conductivity, and wherein the plate-shaped metal material includes at least one of aluminum, stainless steel, nickel, titanium, or calcined carbon.

10. The electronic device of claim 8,
wherein each of the negative electrode base portions is made of a plate-shaped metal material having high conductivity, and wherein the plate-shaped metal material includes at least one of copper, stainless steel, aluminum, nickel, titanium, or calcined carbon.

11. The electronic device of claim 1, wherein the mixture layers are formed with a mixture of an active material, a conductive agent, and a binder or is formed by adding a filler to the mixture.

12. The electronic device of claim 1, wherein the PCM component is disposed near the at least one printed circuit board.

13. The electronic device of claim 1, wherein the first cell area and the second cell area of the battery cell operate to be folded in a range of 0 to 360 degrees according to a folded state of the first housing and the second housing.

14. The electronic device of claim 1, wherein the first cell area and the second cell area of the battery cell have different sizes.

15. The electronic device of claim 1, wherein the PCM component is electrically connected to conductive terminals drawn out from a battery pouch forming an outer surface of the battery cell.

16. The electronic device claim 15, wherein the PCM component comprises:
- a PCM;
- a case configured to receive the PCM;
- a coupling member configured to perform a buffering action while fixing the case to the battery pouch; and
- a closing member configured to close to cover together the battery pouch and the case in which the PCM is received.

17. The electronic device of claim 1, further comprising:
a flexible display crossing the first surface and the third surface.

18. A battery pack disposed inside an electronic device, the battery pack comprising:
a battery cell comprising:
- a first cell area,
- a second cell area extended from the first cell area,
- a foldable area connecting the first cell area and the second cell area,
- a plurality of base portions stacked and extending from the first cell area to the second cell area through the foldable area, the plurality of base portions being electrically insulated through separators, and
- mixture layers applied to one surface or both surfaces of each of the plurality of base portions; and a protective circuit module (PCM) component extending from at least a portion of the battery cell and being electrically connected to a printed circuit board of the electronic device, wherein the mixture layers are omitted in the foldable area and the foldable area includes a stacked structure of the plurality of base portions and the separators, wherein each of the plurality of base portions have different lengths from each other in the foldable area, and wherein each of the separators have different lengths from each other in the foldable area.

* * * * *